US008073193B2

(12) United States Patent
Rhoads

(10) Patent No.: US 8,073,193 B2
(45) Date of Patent: *Dec. 6, 2011

(54) METHODS AND SYSTEMS FOR STEGANOGRAPHIC PROCESSING

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 42 days.

This patent is subject to a terminal disclaimer.

(21) Appl. No.: 12/560,177

(22) Filed: Sep. 15, 2009

(65) Prior Publication Data

US 2010/0008536 A1      Jan. 14, 2010

Related U.S. Application Data

(60) Continuation of application No. 11/678,474, filed on Feb. 23, 2007, now Pat. No. 7,724,919, which is a continuation-in-part of application No. 10/856,682, filed on May 27, 2004, now Pat. No. 7,184,570, which is a division of application No. 10/358,447, filed on Feb. 4, 2003, now Pat. No. 6,744,907, which is a continuation of application No. 09/618,779, filed on Jul. 17, 2000, now Pat. No. 6,535,618, which is a continuation-in-part of application No. 09/150,147, filed on Sep. 9, 1998, now abandoned, which is a division of application No. 08/438,159, filed on May 8, 1995, now Pat. No. 5,850,481, which is a continuation-in-part of application No. 08/327,426, filed on Oct. 21, 1994, now Pat. No. 5,768,426.

(51) Int. Cl.
*H04K 1/00* (2006.01)

(52) U.S. Cl. ...................................... 382/100

(58) Field of Classification Search .................. 382/100, 382/232; 713/176; 348/461, 467; 380/287, 380/54, 55
See application file for complete search history.

(56) References Cited

U.S. PATENT DOCUMENTS

| | | | |
|---|---|---|---|
| 3,406,344 A | 10/1968 | Hopper | 325/50 |
| 3,919,479 A | 11/1975 | Moon et al. | 179/1 SB |
| 3,950,782 A | 4/1976 | Carey et al. | 360/72 |
| 3,984,624 A | 10/1976 | Waggener | 178/5.6 |
| 3,998,160 A | 12/1976 | Pearce | 101/426 |
| 4,025,851 A | 5/1977 | Haselwood et al. | 325/31 |
| 4,184,700 A | 1/1980 | Greenaway | 283/6 |
| 4,230,990 A | 10/1980 | Lert, Jr. et al. | 455/67 |
| 4,238,849 A | 12/1980 | Gassmann | 370/11 |
| 4,313,197 A | 1/1982 | Maxemchuk | 370/111 |
| 4,379,947 A | 4/1983 | Warner | 179/1 GD |
| 4,389,671 A | 6/1983 | Posner et al. | 358/124 |
| 4,395,600 A | 7/1983 | Lundy et al. | 179/1.5 M |
| 4,450,531 A | 5/1984 | Kenyon et al. | 364/604 |
| 4,660,859 A | 4/1987 | Natesh | 283/70 |
| 4,672,605 A | 6/1987 | Hustig et al. | 370/76 |
| 4,677,466 A | 6/1987 | Lert, Jr. et al. | 358/84 |
| 4,739,398 A | 4/1988 | Thomas et al. | 358/84 |
| 4,750,173 A | 6/1988 | Bluthgen | 370/111 |
| 4,780,397 A | 10/1988 | Tsuchiya | 430/94 |
| 4,796,292 A | 1/1989 | Thomas | 379/91 |
| 4,807,031 A | 2/1989 | Broughton et al. | 358/142 |
| 4,858,000 A | 8/1989 | Lu | 358/84 |
| 4,876,617 A | 10/1989 | Best et al. | 360/60 |
| 4,931,871 A | 6/1990 | Kramer | 358/142 |
| 4,939,515 A | 7/1990 | Adelson | 341/51 |
| 4,943,973 A | 7/1990 | Werner | 375/1 |
| 4,945,412 A | 7/1990 | Kramer | 358/142 |
| 4,969,041 A | 11/1990 | O'Grady et al. | 358/142 |
| 5,077,608 A | 12/1991 | Dubner | 358/183 |
| 5,103,459 A | 4/1992 | Gilhousen et al. | 375/1 |
| 5,113,437 A | 5/1992 | Best et al. | 380/3 |
| 5,146,457 A | 9/1992 | Veldhuis et al. | 370/111 |
| 5,161,210 A | 11/1992 | Druyvesteyn et al. | 395/2 |
| 5,228,056 A | 7/1993 | Schilling | 375/1 |
| 5,243,423 A | 9/1993 | DeJean et al. | 358/142 |
| 5,319,735 A | 6/1994 | Preuss et al. | 395/2.14 |
| 5,404,377 A | 4/1995 | Moses | 370/200 |
| 5,425,100 A | 6/1995 | Thomas et al. | 380/20 |
| 5,450,490 A | 9/1995 | Jensen et al. | 380/6 |
| 5,469,222 A | 11/1995 | Sprague | 348/580 |
| 5,493,677 A | 2/1996 | Balogh et al. | 395/600 |
| 5,510,900 A | 4/1996 | Shirochi et al. | 358/335 |
| 5,524,933 A | 6/1996 | Kunt et al. | 283/67 |
| 5,526,427 A | 6/1996 | Thomas et al. | 380/20 |

(Continued)

FOREIGN PATENT DOCUMENTS

DE      2943436 A1      5/1981

(Continued)

OTHER PUBLICATIONS

U.S. Appl. No. 09/801,515, filed Mar. 7, 2001, with Amendment after allowance, dated Jun. 13, 2006.

(Continued)

*Primary Examiner* — Andrew W Johns

(57) ABSTRACT

Electronic content data (e.g., audio or visual) can be steganographically encoded for a variety of purposes. One claim recites a method practiced by a first party, including the acts: (a) receiving content that has been previously steganographically encoded by a second party with first plural-bit data; and (b) utilizing a programmed electronic processor, further steganographically encoding the content with a second plural-bit data different than the first. The further encoding includes altering digital data representing human-perceptible attributes of the content, in a manner that is dependent on the content. Both of the first and second plural-bit data are represented in encoded content. Of course, a great variety of other claims, arrangements and features are provided.

16 Claims, 7 Drawing Sheets

U.S. PATENT DOCUMENTS

| | | | | |
|---|---|---|---|---|
| 5,530,759 | A | 6/1996 | Braudaway et al. | 380/54 |
| 5,568,570 | A | 10/1996 | Rabbani | 382/238 |
| 5,574,962 | A | 11/1996 | Fardeau et al. | 455/2 |
| 5,579,124 | A | 11/1996 | Aijala et al. | 386/96 |
| 5,613,004 | A | 3/1997 | Cooperman et al. | 380/28 |
| 5,636,292 | A | 6/1997 | Rhoads | 382/232 |
| 5,646,997 | A | 7/1997 | Barton | 380/23 |
| 5,652,626 | A | 7/1997 | Kawakami et al. | 348/463 |
| 5,659,726 | A | 8/1997 | Sandford, II et al. | 395/612 |
| 5,664,018 | A | 9/1997 | Leighton | 380/54 |
| 5,671,267 | A | 9/1997 | August et al. | 379/61 |
| 5,687,191 | A | 11/1997 | Lee et al. | 375/216 |
| 5,687,236 | A | 11/1997 | Moskowitz et al. | 380/28 |
| 5,689,587 | A | 11/1997 | Bender et al. | 382/232 |
| 5,719,937 | A | 2/1998 | Warren et al. | 380/4 |
| 5,721,788 | A * | 2/1998 | Powell et al. | 382/100 |
| 5,745,569 | A | 4/1998 | Moskowitz et al. | 380/4 |
| 5,745,604 | A | 4/1998 | Rhoads | 382/232 |
| 5,748,763 | A | 5/1998 | Rhoads | 382/115 |
| 5,764,763 | A | 6/1998 | Jensen et al. | 380/6 |
| 5,765,152 | A | 6/1998 | Erickson | 707/9 |
| 5,768,426 | A | 6/1998 | Rhoads | 382/232 |
| 5,774,452 | A | 6/1998 | Wolosewicz | 370/212 |
| 5,809,160 | A | 9/1998 | Powell et al. | 382/100 |
| 5,822,360 | A | 10/1998 | Lee et al. | 375/200 |
| 5,822,432 | A | 10/1998 | Moskowitz et al. | 380/28 |
| 5,826,227 | A | 10/1998 | Jayant | 704/229 |
| 5,838,458 | A | 11/1998 | Tsai | 358/402 |
| 5,841,978 | A | 11/1998 | Rhoads | 395/200.47 |
| 5,850,481 | A | 12/1998 | Rhoads | 382/232 |
| 5,857,038 | A | 1/1999 | Owada et al. | 382/284 |
| 5,862,260 | A | 1/1999 | Rhoads | 382/232 |
| 5,889,868 | A | 3/1999 | Moskowitz et al. | 380/51 |
| 5,905,800 | A | 5/1999 | Moskowitz et al. | 380/28 |
| 5,918,223 | A | 6/1999 | Blum et al. | 707/1 |
| 5,930,369 | A | 7/1999 | Cox et al. | 380/54 |
| 5,940,135 | A | 8/1999 | Petrovic et al. | 348/473 |
| 5,943,422 | A | 8/1999 | Van Wie et al. | 380/9 |
| 5,963,909 | A | 10/1999 | Warren et al. | 705/1 |
| 5,978,773 | A | 11/1999 | Hudetz et al. | 705/23 |
| 5,987,127 | A | 11/1999 | Ikenoue et al. | 380/7 |
| 6,026,193 | A | 2/2000 | Rhoads | 382/232 |
| 6,088,455 | A | 7/2000 | Logan et al. | 380/200 |
| 6,122,392 | A | 9/2000 | Rhoads | 382/100 |
| 6,122,403 | A | 9/2000 | Rhoads | 382/233 |
| 6,181,802 | B1 | 1/2001 | Todd | 382/100 |
| 6,185,683 | B1 | 2/2001 | Ginter et al. | 713/176 |
| 6,199,048 | B1 | 3/2001 | Hudetz et al. | 705/23 |
| 6,211,919 | B1 | 4/2001 | Zink et al. | 348/473 |
| 6,233,684 | B1 | 5/2001 | Stefik et al. | 713/176 |
| 6,246,439 | B1 | 6/2001 | Zink et al. | 348/473 |
| 6,266,430 | B1 | 7/2001 | Rhoads | 382/100 |
| 6,272,176 | B1 | 8/2001 | Srinivasan | 375/240 |
| 6,272,634 | B1 | 8/2001 | Tewfik et al. | 713/176 |
| 6,285,774 | B1 | 9/2001 | Schumann et al. | 382/100 |
| 6,285,776 | B1 | 9/2001 | Rhoads | 382/100 |
| 6,289,108 | B1 | 9/2001 | Rhoads | 382/100 |
| 6,330,335 | B1 | 12/2001 | Rhoads | 380/252 |
| 6,334,187 | B1 | 12/2001 | Kadono | 713/176 |
| 6,343,138 | B1 | 1/2002 | Rhoads | 382/100 |
| 6,345,256 | B1 | 2/2002 | Milsted et al. | 705/1 |
| 6,353,672 | B1 | 3/2002 | Rhoads | 382/100 |
| 6,363,159 | B1 | 3/2002 | Rhoads | 382/100 |
| 6,389,151 | B1 | 5/2002 | Carr et al. | 382/100 |
| 6,400,827 | B1 | 6/2002 | Rhoads | 382/100 |
| 6,404,898 | B1 | 6/2002 | Rhoads | 382/100 |
| 6,425,081 | B1 | 7/2002 | Iwamura | 713/176 |
| 6,427,012 | B1 | 7/2002 | Petrovic | 380/238 |
| 6,427,020 | B1 | 7/2002 | Rhoads | 382/100 |
| 6,430,302 | B2 | 8/2002 | Rhoads | 382/100 |
| 6,442,283 | B1 | 8/2002 | Tewfik et al. | 382/100 |
| 6,449,379 | B1 | 9/2002 | Rhoads | 382/100 |
| 6,456,726 | B1 | 9/2002 | Yu et al. | 382/100 |
| 6,496,591 | B1 | 12/2002 | Rhoads | 382/100 |
| 6,505,160 | B1 | 1/2003 | Levy et al. | 704/270 |
| 6,519,352 | B2 | 2/2003 | Rhoads | 382/100 |
| 6,522,771 | B2 | 2/2003 | Rhoads | 382/100 |
| 6,535,618 | B1 | 3/2003 | Rhoads | 382/100 |
| 6,539,095 | B1 | 3/2003 | Rhoads | 382/73.1 |
| 6,542,618 | B1 | 4/2003 | Rhoads | 382/100 |
| 6,542,620 | B1 | 4/2003 | Rhoads | 382/100 |
| 6,542,869 | B1 | 4/2003 | Foote | 704/500 |
| 6,560,349 | B1 | 5/2003 | Rhoads | 382/100 |
| 6,567,534 | B1 | 5/2003 | Rhoads | 382/100 |
| 6,567,535 | B2 | 5/2003 | Rhoads | 382/100 |
| 6,567,780 | B2 | 5/2003 | Rhoads | 704/273 |
| 6,574,350 | B1 | 6/2003 | Rhoads et al. | 382/100 |
| 6,580,819 | B1 | 6/2003 | Rhoads | 382/135 |
| 6,587,821 | B1 | 7/2003 | Rhoads | 704/270 |
| 6,590,997 | B2 | 7/2003 | Rhoads | 382/100 |
| 6,611,607 | B1 | 8/2003 | Davis et al. | 382/100 |
| 6,614,914 | B1 | 9/2003 | Rhoads et al. | 382/100 |
| 6,618,484 | B1 | 9/2003 | Van Wie et al. | 380/232 |
| 6,647,129 | B2 | 11/2003 | Rhoads | 382/100 |
| 6,654,480 | B2 | 11/2003 | Rhoads | 382/100 |
| 6,654,887 | B2 | 11/2003 | Rhoads | 713/176 |
| 6,675,146 | B2 | 1/2004 | Rhoads | 704/270 |
| 6,694,041 | B1 | 2/2004 | Brunk | 382/100 |
| 6,724,912 | B1 | 4/2004 | Carr et al. | 382/100 |
| 6,728,390 | B2 | 4/2004 | Rhoads et al. | 382/100 |
| 6,737,957 | B1 | 5/2004 | Petrovic et al. | 340/5.86 |
| 6,738,495 | B2 | 5/2004 | Rhoads et al. | 382/100 |
| 6,744,906 | B2 | 6/2004 | Rhoads et al. | 382/100 |
| 6,744,907 | B2 | 6/2004 | Rhoads | 382/100 |
| 6,748,362 | B1 | 6/2004 | Meyer et al. | 704/500 |
| 6,748,533 | B1 | 6/2004 | Wu et al. | 713/176 |
| 6,750,985 | B2 | 6/2004 | Rhoads | 358/3.28 |
| 6,754,377 | B2 | 6/2004 | Rhoads | 382/135 |
| 6,757,406 | B2 | 6/2004 | Rhoads | 382/100 |
| 6,760,464 | B2 | 7/2004 | Brunk | 382/100 |
| 6,768,808 | B2 | 7/2004 | Rhoads | 382/100 |
| 6,771,796 | B2 | 8/2004 | Rhoads | 382/100 |
| 6,778,682 | B2 | 8/2004 | Rhoads | 382/100 |
| 6,785,815 | B1 | 8/2004 | Serret-Avila et al. | 713/176 |
| 6,792,542 | B1 | 9/2004 | Lee et al. | 713/200 |
| 6,804,377 | B2 | 10/2004 | Reed et al. | 382/100 |
| 6,804,379 | B2 | 10/2004 | Rhoads | 382/101 |
| 6,807,285 | B1 | 10/2004 | Iwamura | 382/100 |
| 6,834,308 | B1 | 12/2004 | Ikezoye et al. | 709/231 |
| 6,850,626 | B2 | 2/2005 | Rhoads et al. | 382/100 |
| 6,868,497 | B1 | 3/2005 | Levy | 713/200 |
| 6,882,738 | B2 | 4/2005 | Davis et al. | 382/104 |
| 6,915,481 | B1 | 7/2005 | Tewfik et al. | 715/500.1 |
| 6,931,451 | B1 | 8/2005 | Logan et al. | 709/231 |
| 6,941,275 | B1 | 9/2005 | Swierczek | 705/26 |
| 6,944,298 | B1 | 9/2005 | Rhoads | 380/205 |
| 6,959,100 | B2 | 10/2005 | Rhoads | 382/100 |
| 6,959,386 | B2 | 10/2005 | Rhoads | 713/176 |
| 6,961,444 | B2 | 11/2005 | Levy | 382/100 |
| 6,968,337 | B2 | 11/2005 | Wold | 707/100 |
| 6,970,573 | B2 | 11/2005 | Carr et al. | 382/100 |
| 6,975,746 | B2 | 12/2005 | Davis et al. | 382/100 |
| 6,978,036 | B2 | 12/2005 | Alattar et al. | 382/100 |
| 6,983,051 | B1 | 1/2006 | Rhoads | 380/252 |
| 6,987,862 | B2 | 1/2006 | Rhoads | 382/100 |
| 6,990,584 | B1 | 1/2006 | Yoshiura et al. | 713/176 |
| 6,993,152 | B2 | 1/2006 | Patterson et al. | 382/100 |
| 6,993,154 | B2 | 1/2006 | Brunk | 382/100 |
| 6,996,252 | B2 | 2/2006 | Reed et al. | 382/100 |
| 7,003,132 | B2 | 2/2006 | Rhoads | 382/100 |
| 7,006,555 | B1 | 2/2006 | Srinivasan | 375/133 |
| 7,016,516 | B2 | 3/2006 | Rhoads | 382/100 |
| 7,017,045 | B1 | 3/2006 | Krishnamachari | 713/176 |
| 7,020,303 | B2 | 3/2006 | Levy et al. | 382/100 |
| 7,020,304 | B2 | 3/2006 | Alattar et al. | 382/100 |
| 7,020,349 | B2 | 3/2006 | Brunk | 382/289 |
| 7,024,018 | B2 | 4/2006 | Petrovic | 382/100 |
| 7,027,612 | B2 | 4/2006 | Patterson et al. | 382/100 |
| 7,027,614 | B2 | 4/2006 | Reed | 382/100 |
| 7,046,808 | B2 | 5/2006 | Metois et al. | 380/252 |
| 7,050,603 | B2 | 5/2006 | Rhoads et al. | 382/100 |
| 7,054,462 | B2 | 5/2006 | Rhoads et al. | 382/100 |
| 7,054,463 | B2 | 5/2006 | Rhoads et al. | 382/100 |
| 7,058,809 | B2 | 6/2006 | White et al. | 713/176 |
| 7,062,070 | B2 | 6/2006 | Powell et al. | 382/100 |
| 7,076,084 | B2 | 7/2006 | Davis et al. | 382/100 |
| 7,095,871 | B2 | 8/2006 | Jones et al. | 382/100 |

| | | | | | | | |
|---|---|---|---|---|---|---|---|
| 7,113,569 B2 | 9/2006 | Okumura et al. | 378/150 | 2002/0061122 A1 | 5/2002 | Fujihara et al. | 382/100 |
| 7,113,614 B2 | 9/2006 | Rhoads | 382/100 | 2002/0062442 A1 | 5/2002 | Kurahashi | 713/176 |
| 7,113,615 B2 | 9/2006 | Rhoads et al. | 382/100 | 2002/0068987 A1 | 6/2002 | Hars | 700/94 |
| 7,116,781 B2 | 10/2006 | Rhoads | 380/59 | 2002/0080995 A1 | 6/2002 | Rhoads | 382/100 |
| 7,127,744 B2 | 10/2006 | Levy | 726/26 | 2002/0097873 A1 | 7/2002 | Petrovic | 380/238 |
| 7,130,087 B2 | 10/2006 | Rhoads | 358/3.28 | 2002/0097891 A1 | 7/2002 | Hinishi | 382/100 |
| 7,142,691 B2 | 11/2006 | Levy | 382/100 | 2002/0122567 A1 | 9/2002 | Kuzmich et al. | 382/100 |
| 7,171,016 B1 | 1/2007 | Rhoads | 382/100 | 2002/0126842 A1 | 9/2002 | Hollar | 380/201 |
| 7,181,022 B2 | 2/2007 | Rhoads | 381/73.1 | 2002/0136429 A1 | 9/2002 | Stach et al. | 382/100 |
| 7,184,570 B2 | 2/2007 | Rhoads | 382/100 | 2002/0150246 A1 | 10/2002 | Ogino | 380/203 |
| 7,197,164 B2 | 3/2007 | Levy | 382/100 | 2002/0158137 A1 | 10/2002 | Grey et al. | 235/494 |
| 7,224,819 B2 | 5/2007 | Levy et al. | 382/100 | 2002/0168087 A1 | 11/2002 | Petrovic | 382/100 |
| 7,239,734 B2 | 7/2007 | Alattar et al. | 382/135 | 2002/0178368 A1 | 11/2002 | Yin et al. | 713/186 |
| 7,242,790 B2 | 7/2007 | Rhoads | 382/100 | 2002/0181732 A1 | 12/2002 | Safavi-Naini et al. | 382/100 |
| 7,246,239 B2 | 7/2007 | Rodriguez et al. | 713/176 | 2003/0009669 A1 | 1/2003 | White et al. | 713/176 |
| 7,248,715 B2 | 7/2007 | Levy | 382/100 | 2003/0021440 A1 | 1/2003 | Rhoads | 382/100 |
| 7,263,203 B2 | 8/2007 | Rhoads et al. | 382/100 | 2003/0033529 A1 | 2/2003 | Ratnakar et al. | 713/176 |
| 7,266,217 B2 | 9/2007 | Rhoads et al. | 382/100 | 2003/0081779 A1 | 5/2003 | Ogino | 380/207 |
| 7,269,275 B2 | 9/2007 | Carr et al. | 382/100 | 2003/0088775 A1 | 5/2003 | Weimerskirch | 713/176 |
| 7,277,468 B2 | 10/2007 | Tian et al. | 375/130 | 2003/0138128 A1 | 7/2003 | Rhoads | 382/100 |
| 7,286,684 B2 | 10/2007 | Rhoads et al. | 382/100 | 2004/0057581 A1 | 3/2004 | Rhoads | 380/59 |
| 7,298,864 B2 | 11/2007 | Jones | 382/100 | 2004/0181671 A1 | 9/2004 | Brundage et al. | 713/176 |
| 7,305,117 B2 | 12/2007 | Davis et al. | 382/141 | 2004/0223626 A1 | 11/2004 | Honsinger et al. | 382/100 |
| 7,313,253 B2 | 12/2007 | Davis et al. | 382/100 | 2004/0240846 A1 | 12/2004 | Cookson et al. | 386/94 |
| 7,321,667 B2 | 1/2008 | Stach | 382/100 | 2004/0263911 A1 | 12/2004 | Rodriguez et al. | 358/3.28 |
| 7,333,957 B2 | 2/2008 | Levy et al. | 705/58 | 2005/0071604 A1 | 3/2005 | Tanner et al. | 712/205 |
| 7,340,076 B2 | 3/2008 | Stach et al. | 382/100 | 2005/0108535 A1 | 5/2005 | Bruekers et al. | 713/176 |
| 7,346,776 B2 | 3/2008 | Levy et al. | 713/176 | 2006/0028689 A1 | 2/2006 | Perry et al. | 358/3.28 |
| 7,349,552 B2 | 3/2008 | Levy et al. | 382/100 | 2006/0062386 A1 | 3/2006 | Rhoads | 380/236 |
| 7,349,555 B2 | 3/2008 | Rhoads | 382/100 | 2006/0075244 A1 | 4/2006 | Schumann et al. | 713/176 |
| 7,359,528 B2 | 4/2008 | Rhoads | 382/100 | 2006/0159303 A1 | 7/2006 | Davis et al. | 382/100 |
| 7,372,976 B2 | 5/2008 | Rhoads et al. | 382/100 | 2007/0016790 A1 | 1/2007 | Brundage et al. | 713/176 |
| 7,415,129 B2 | 8/2008 | Rhoads | 382/100 | 2007/0172098 A1 | 7/2007 | Rhoads et al. | 382/100 |
| 7,418,111 B2 | 8/2008 | Rhoads | 382/100 | 2007/0180251 A1 | 8/2007 | Carr et al. | 713/176 |
| 7,424,132 B2 | 9/2008 | Rhoads | 382/100 | 2007/0201835 A1 | 8/2007 | Rhoads | 386/96 |
| 7,437,430 B2 | 10/2008 | Rhoads | 709/219 | 2007/0208711 A1 | 9/2007 | Rhoads et al. | 707/3 |
| 7,460,726 B2 * | 12/2008 | Levy et al. | 382/240 | 2008/0016360 A1 | 1/2008 | Rodriguez et al. | 713/176 |
| 7,486,799 B2 | 2/2009 | Rhoads | 382/100 | 2008/0131083 A1 | 6/2008 | Rhoads | 386/96 |
| 7,499,564 B2 | 3/2009 | Rhoads | 382/100 | 2008/0131084 A1 | 6/2008 | Rhoads | 386/96 |
| 7,499,566 B2 | 3/2009 | Rhoads | 382/100 | 2008/0140433 A1 | 6/2008 | Levy et al. | 705/1 |
| 7,500,007 B2 | 3/2009 | Ikezoye et al. | 709/231 | 2008/0149713 A1 | 6/2008 | Brundage | 235/435 |
| 7,502,759 B2 | 3/2009 | Hannigan et al. | 705/51 | 2008/0253740 A1 | 10/2008 | Rhoads | 386/95 |
| 7,532,741 B2 | 5/2009 | Stach | 382/100 | 2008/0270801 A1 | 10/2008 | Levy et al. | 713/179 |
| 7,536,555 B2 | 5/2009 | Rhoads | 713/176 | 2008/0275906 A1 | 11/2008 | Rhoads et al. | 707/102 |
| 7,539,325 B2 | 5/2009 | Rhoads et al. | 382/100 | 2009/0252401 A1 | 10/2009 | Davis et al. | 382/141 |
| 7,548,643 B2 | 6/2009 | Davis et al. | 382/141 | 2010/0008534 A1 | 1/2010 | Rhoads | 382/100 |
| 7,555,139 B2 | 6/2009 | Rhoads et al. | 382/100 | 2010/0008537 A1 | 1/2010 | Rhoads | 382/100 |
| 7,567,686 B2 | 7/2009 | Rhoads | 382/100 | 2010/0021004 A1 | 1/2010 | Rhoads | 382/100 |
| 7,570,784 B2 | 8/2009 | Alattar | 382/100 | 2010/0027969 A1 | 2/2010 | Alattar | 386/94 |
| 7,602,940 B2 | 10/2009 | Rhoads et al. | 382/100 | 2010/0040255 A1 | 2/2010 | Rhoads | 382/100 |
| 7,602,977 B2 | 10/2009 | Rhoads et al. | 382/100 | 2010/0042843 A1 | 2/2010 | Brunk et al. | 713/176 |
| 7,602,978 B2 * | 10/2009 | Levy et al. | 382/232 | 2010/0119108 A1 | 5/2010 | Rhoads | 382/100 |
| 7,606,390 B2 | 10/2009 | Rhoads | 382/100 | 2010/0131515 A1 | 5/2010 | Rhoads et al. | 713/176 |
| 7,607,016 B2 | 10/2009 | Brunk et al. | 713/176 | 2010/0142752 A1 | 6/2010 | Rhoads et al. | 382/100 |
| 7,620,200 B2 | 11/2009 | Rhoads | 382/100 | 2010/0146285 A1 | 6/2010 | Rhoads et al. | 713/176 |
| 7,639,837 B2 | 12/2009 | Carr et al. | 382/100 | 2010/0163629 A1 | 7/2010 | Rhoads et al. | 235/487 |
| 7,643,649 B2 | 1/2010 | Davis et al. | 382/100 | 2010/0172538 A1 | 7/2010 | Rhoads | 382/100 |
| 7,656,930 B2 | 2/2010 | Tian et al. | 375/130 | | | | |
| 7,672,477 B2 | 3/2010 | Rhoads | 382/100 | | | | |
| 7,676,059 B2 | 3/2010 | Rhoads | 382/100 | | | | |
| 7,693,965 B2 | 4/2010 | Rhoads | 709/219 | | | | |
| 7,697,719 B2 | 4/2010 | Rhoads | 382/100 | | | | |
| 7,702,511 B2 | 4/2010 | Rhoads | 704/270 | | | | |
| 7,711,143 B2 | 5/2010 | Rhoads | 382/100 | | | | |
| 7,711,144 B2 | 5/2010 | Hannigan et al. | 382/100 | | | | |
| 7,720,249 B2 | 5/2010 | Rhoads | 382/100 | | | | |
| 7,720,255 B2 | 5/2010 | Rhoads | 382/100 | | | | |
| 7,724,919 B2 | 5/2010 | Rhoads | 382/100 | | | | |
| 7,730,313 B2 | 6/2010 | Schumann et al. | 713/176 | | | | |
| 7,763,179 B2 | 7/2010 | Levy et al. | 216/94 | | | | |
| 7,778,437 B2 | 8/2010 | Rhoads et al. | 382/100 | | | | |
| 7,796,826 B2 | 9/2010 | Rhoads et al. | 382/233 | | | | |
| 7,831,062 B2 | 11/2010 | Stach | 382/100 | | | | |
| 2001/0019611 A1 | 9/2001 | Hilton | 380/203 | | | | |
| 2001/0022848 A1 | 9/2001 | Rhoads | 382/100 | | | | |
| 2001/0024510 A1 | 9/2001 | Iwamura | 382/100 | | | | |
| 2001/0047478 A1 | 11/2001 | Mase | 713/176 | | | | |
| 2001/0052076 A1 | 12/2001 | Kadono | 713/176 | | | | |
| 2002/0061121 A1 | 5/2002 | Rhoads et al. | 382/100 | | | | |

FOREIGN PATENT DOCUMENTS

| | | |
|---|---|---|
| DE | 3806414 A1 | 9/1989 |
| EP | 0493091 A1 | 7/1992 |
| EP | 1077570 A2 | 2/2001 |
| GB | 2196167 A | 4/1988 |
| JP | 4-248771 A | 9/1992 |
| WO | WO9833105 A1 | 7/1998 |
| WO | WO0105075 A1 | 1/2001 |
| WO | WO0139121 A1 | 5/2001 |
| WO | WO0217631 A1 | 2/2002 |
| WO | WO0219589 A1 | 3/2002 |
| WO | WO02056264 A1 | 7/2002 |
| WO | WO02098670 A2 | 12/2002 |

OTHER PUBLICATIONS

Bender et al., "Techniques for Data Hiding," Proc. SPIE, vol. 2420, Feb. 9, 1995, pp. 164-173.

Blackburn, "A Tool for Content Based Navigation of Music," ACM Multimedia 98, 14 pages.

deRoure, "A Multiagent System for Content Based Navigation of

Music," ACM Multimedia, Oct. 1999, 4 pp.

Bruckstein et al., "A Holographic Transform Domain Image Watermarking Method," Circuits, Systems and Signal Processing, vol. 17, No. 3, pp. 1-29, 31-39, 1998 (includes Bell Labs "Internal Memo" of Sep. 1994 as appendix).

Burgett et al., "A Novel Method for Copyright Labeling Digitized Image Data," Sep. 18, 1995, 12 pages.

Buskirk, "Are Digital Music Watermarks a Blessing or a Curse?" Wired on-Line, Aug. 20, 2007, http://www.wired.com/entertainment/music/commentary/listeningpost/2007/08/listeningpost_0820, 2 pages.

Cox et al., "Secure Spread Specturm Watermarking for Images, Audio and Video," Proc. IEEE Southcon 96, pp. 243-246, Jun. 1996.

Dittman et al, "Combined video and audio Watermarking: Embedding content information in multimedia data," Proc. of SPIE, pp. 455-464, Jan. 24-26, 2000.

Foote, "An Overview of Audio Information Retrieval," Multimedia Systems, v.7, n. 1, p. 2-10, Jan. 1999.

Ghias et al, Query by Humming: Musical Information Retrieval In An Audio Database. In ACM Multimedia, pp. 231-236, Nov. 1995.

Hartung, "Digital Watermarking of Raw and Compressed Video," Proc. SPIE 2952, Digital Compression Technologies and Systems for Video Communications, Oct. 1996, pp. 205-213.

P.C.J. Hill, "Simultaneous Subliminal Signalling in Conventional Sound Circuits," BBC Engineering, No. 90, pp. 14-31, 1972.

Kageyama et al, Melody Retrieval with Humming, Proceedings of Int. Computer Music Conference (ICMC), 1993, 3 pages.

Komatsu et al., "Authentication System Using Concealed Image in Telematics," Memoirs of the School of Science & Engineering, Waseda Univ., No. 52, 1988, pp. 45-60.

Komatsu, N., "Information Security for Facsimile Communication," Journal of the Institute of Image Electronics Engineers of Japan, 1990, vol. 19 No. 4, pp. 229-235 (English translation not available.).

Komatsu et al., "A Proposal on Digital Watermark in Document Image Communication and Its Application to Realizing a Signature," Electronics and Communications in Japan, Part 1, vol. 73, No. 5, 1990, pp. 22-23.

Kurak et al., "A Cautionary Note on Image Downgrading," IEEE, 1992, pp. 153-159.

Matsui et al., "Video-Steganography: How to Secretly Embed a Signature in a Picture," Proc.: Technological Strategies for Protecting Intellectual Property in the Networked Multimedia Environment, pp. 187-206, vol. 1, Issue 1, Jan. 1994.

Matsutani, "The Construction of Copyright-Protected Image Data Technical Report of IEICE," ISEC94-58, 20 pages,, 1995.

Muscle Fish press release, Muscle Fish's Audio Search Technology to be Encapsulated into Informix Datablade Module, Jul. 10, 1996, 1 page.

Namba S. et al., "A Program Identification Code Transmission System Using Low-Frequency Audio Signals," NHK Laboratories Note, Ser. No. 314, Mar. 1985.

Philips, "Meta-Information, The Network of the Future and Intellectual Property Protection," 8 pages, printed May 21, 2008.

Sandford II, et al., "The Data Embedding Method," SPIE vol. 2615, Oct. 23, 1995, pp. 226-259.

"Simultaneous subliminal signalling in conventional sound circuits: a feasibility study," BBC Research Department Report No. 1971/1, 16 pages.

Smith, et al, "Music Information Retrieval Using Audio Input." Proc AAAI Spring Symposium on Intelligent Integration and Use of Text, Image, Video and Audio Corpora, 5 pages, 1996.

Steele, R. et al., "Embedding Data in Speech using Scrambling Techniques," IEEE International Conference on Acoustics, Speech and Signal Processing, vol. 3, May 1982.

Steele, R. et al., "Simultaneous Transmission of Speech and Data Using Code-Breaking Techniques," The Bell System Tech. Jour., vol. 60, No. 9, pp. 2081-2105, Nov. 1981.

Szepanski, "A Signal Theoretic Method for Creating Forgery-Proof Documents for Automatic Verification", 1979 Carnahan Conference on Crime Countermeasures.

Ten Kate, et al., "Digital Audio Carrying Extra Information," Philips Research Labs, pp. 1097-1100, IEEE 1990.

Tirkle et al., "Electronic Water Mark," Proc. Digital Image Cuptuing Technology and Applications (DICTA'93), 1993, pp. 666-672.

T. Berners-Lee, L. Masinter, M. McCahill, Uniform Resource Locators (URL), Network Working Group, Request for Comments 1738, Dec. 1994, 25 pages.

T. Berners-Lee, The Original HTTP as defined in 1991, 2 pages, (printed Apr. 19, 2007).

Aug. 29, 2008 Amendment; Jul. 3, 2008 Office Action in Ex Parte Reexamination; Oct. 16, 2007 Determination—Reexamination Ordered; Jul. 26, 2007 "Request for Ex Party Reexamination"; all from Reexam U.S. Appl. No. 90/008,779 (Reexam of US Patent No. 6,199,048).

Jun. 6, 2008 Notice of Allowance; May 3, 2007 Appeal Brief; Aug. 4, 2006 final Office Action; Jun. 15, 2006 Amendment; Feb. 5, 2006 Office Action; Jan. 24, 2006 Amendment; Jul. 13, 2005 final Office Action; all from U.S. Appl. No. 10/090,775 (issued as 7,437,430).

van Schyndel et al., "Towards a Robust Digital Watermark," Second Asian Conference on Computer Vision, pp. 504-508, Dec. 1995.

Wagner, "Fingerprinting," 1983 IEEE, pp. 18-22.

Wold et al, Content-Based Classification, Search, and Retrieval of Audio, IEEE Multimedia Magazine, Fall, 1996.

Xydeas et al., "Embedding Data Into Pictures by Modulo Masking," IEEE Transactions on Communications, 1984, vol. COM-32, No. 1, pp. 56-69.

Zhao et al., "Embedding Robust Labels Into Images for Copyright Protection," Proc. of the International Congress on Intellectual Property Rights for Specialized Information, Knowledge and New Technologies (Vienna, Austria) Aug. 21-25, 1995, 10 pages.

Zhao, "A WWW Service to Embed and Prove Digital Copyright Watermarks," In. Proc. of the European Conf. on Multimedia Applications, Services and Techniques, Louvain-La-Neuve, Belgium, May 1996, 14 pages.

Mar. 12, 2009 Amendment Accompanying RCE in U.S. Appl. No. 11/927,075.

Apr. 4, 2009 Amendment Accompany RCE in assignee's U.S. Appl. No. 09/476,686.

Notice of Allowances dated: i) Jan. 4, 2007; Aug. 18, 2006; and Jul. 5, 2006, each from U.S. Appl. No. 10/277,617 (now U.S. Patent No. 7,224,819), Mar. 21, 2006 Office Action, and Jul. 19, 2006 Amendment in response thereto, each from U.S. Appl. No. 10/277,617.

Notice of Allowances dated May 31, 2005, and Dec. 3, 2004, each from U.S. Appl. No. 10/648,105 (now U.S. Patent No. 6,975,746).

Notice of Allowances dated Apr. 9, 2008, and Oct. 10, 2007, each from U.S. Appl. No. 11/302,972 (published as US 2006-0159303 A1).

Mar. 3, 2003 Notice of Allowance; Aug. 28, 2002 Office Action, and Jan. 28, 2002 Amendment in response thereto, each from U.S. Appl. No. 09/525,865 (now U.S. Patent No. 6,611,607), Mar. 29, 2002 Office Action, and Jul. 26, 2002 Amendment in response thereto, each from U.S. Appl. No. 09/525,865, Jul. 27, 2001 Office Action, and Jul. 29, 2002 Appeal Brief in response thereto, each from U.S. Appl. No. 09/525,865, Apr. 4, 2001 Office Action, and Jul. 5, 2001 Response in response thereto, each from assignee's U.S. Appl. No. 09/525,865.

Nov. 18, 2005 Communication and Sep. 18, 2000 Communication; May 26, 2006 Response to the Nov. 18, 2005 Communication from the EPO; Jun. 6, 2007 Summons to attend oral proceedings, each from the European Patent Office in European Patent Application No. 97 924 752.5.

U.S. Appl. No. 60/158,087, filed Oct. 7, 1999.

U.S. Appl. No. 60/186,565, filed Mar. 2, 2000.

Jul. 25, 2008 Notice of Allowance; May 21, 2008 Amendment; Jan. 23, 2008 non-final Office Action; all from U.S. Appl. No. 11/754,919 (now U.S. Patent No. 7,460,726).

Aug. 7, 2009 Notice of Allowance; Apr. 9, 2009 Amendment; Mar. 19, 2009 non-final Office Action; all from U.S. Appl. No. 12/326,696 (now U.S. Patent No. 7,602,978).

Sep. 25, 2002 Notice of Allowance; Aug. 26, 2002 Amendment; Apr. 26, 2002 non-final Office Action; Jan. 25, 2002 Amendment; Jul. 27, 2001 non-final Office Action; all from Digimarc's U.S. Appl. No. 09/626,984 (now U.S. Patent No. 6,542,620).

Jul. 16, 2002 Reexamination Certificate; May 6, 2002 Examiner's Amendment; Aug. 7, 2001 Patent Owner's Statement for Interview of May 17, 2001; May 25, 2001 Amendment; May 22, 2001 Examiner Interview Summary Record; Apr. 25, 2001 Rexam Non FInal Office Action; Dec. 21, 2001—Rexam Ordered; all from Digimarc's reexamination U.S. Appl. No. 90/005,829 (now US 5,850,481 C1).

Jul. 13, 2004 Reexamination Certificate; Feb. 23, 2004 Intent to Issue a Reexam Certificate; Patentees's Statement about Interview of Jun. 13, 2002; Jul. 5, 2002 Final Rejection; Jun. 13, 2002 Examiner Interview Summary Record; May 9, 2002 Amendment; Oct. 12, 2001 Amendment; Jul. 17, 2001 Amendment; Jul. 17, 2001 Examiner Interview Summary; Jul. 3, 2001 Examiner Interview Summary; Jun. 19, 2001 Reexam—Non Final Office Action; Feb. 14, 2001 Determination—Reexam Ordered; all from Digimarc's reexamination U.S. Appl. No. 90/005,911 (now US 6,122,392 C1).

U.S. Appl. No. 08/154,866, filed Nov. 18, 1993, Geoffrey B. Rhoads.
U.S. Appl. No. 08/215,289, filed Mar. 17, 1994, Geoffrey B. Rhoads.
U.S. Appl. No. 09/150,147, filed Sep. 9, 1998, Geoffrey B. Rhoads.
U.S. Appl. No. 09/151,492, filed Sep. 11, 1998, Bruce L. Davis et al.
U.S. Appl. No. 09/496,380, filed Feb. 2, 2000, Geoffrey B. Rhoads.
U.S. Appl. No. 12/881,911, Sep. 14, 2010, Geoffrey B. Rhoads et al.
U.S. Appl. No. 12/692,470, Jan. 22, 2010, Jun Tian et al.

* cited by examiner

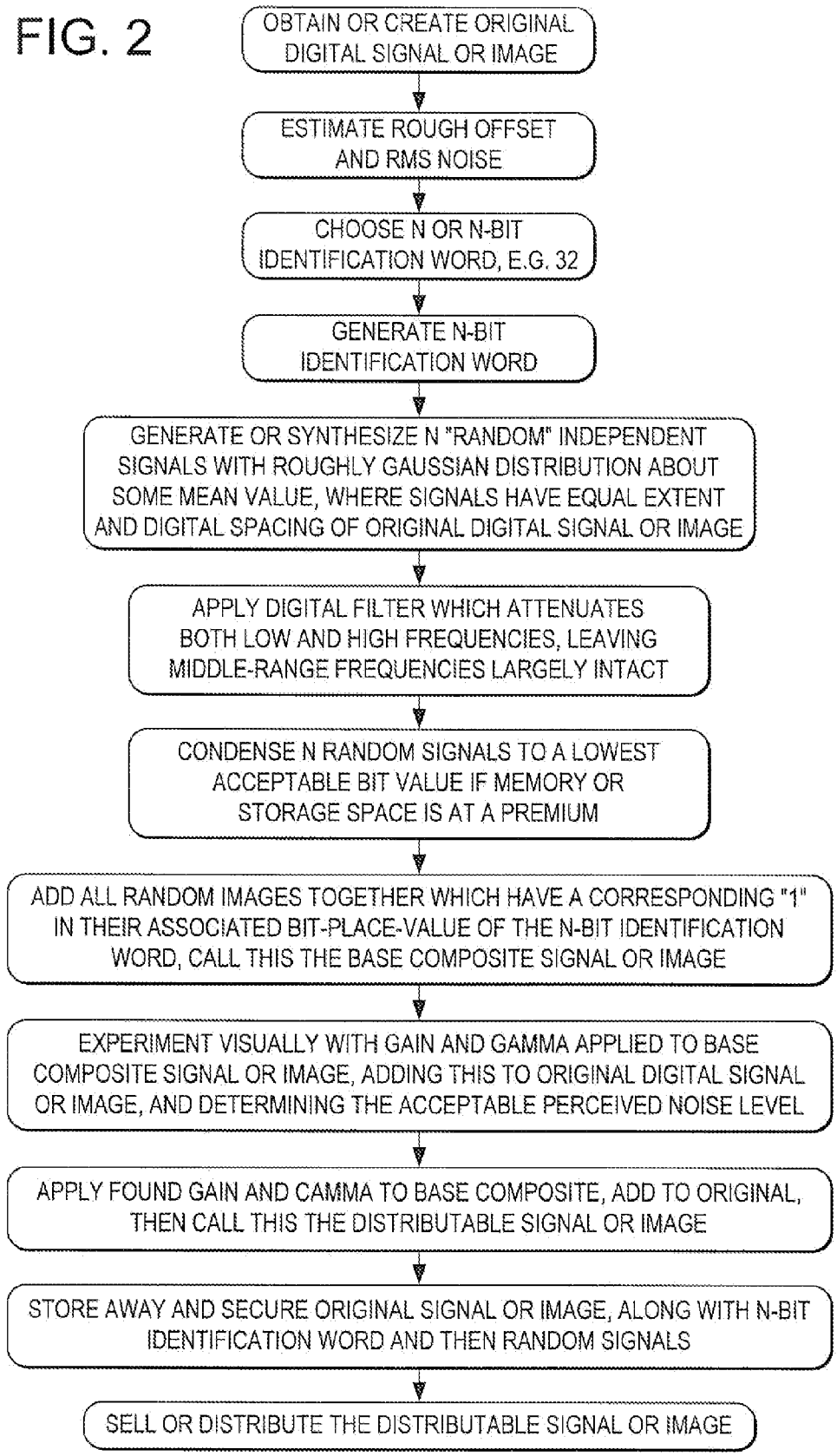

METHODS AND SYSTEMS FOR STEGANOGRAPHIC PROCESSING

RELATED APPLICATION DATA

This application is a continuation of Ser. No. 11/678,474, filed Feb. 23, 2007 (now U.S. Pat. No. 7,724,919), which is a continuation-in-part of application Ser. No. 10/856,682, filed May 27, 2004 (now U.S. Pat. No. 7,184,570), which is a division of application Ser. No. 10/358,447, filed Feb. 4, 2003 (now U.S. Pat. No. 6,744,907), which is a continuation of application Ser. No. 09/618,779, filed Jul. 17, 2000 (now U.S. Pat. No. 6,535,618), which is a continuation-in-part of application Ser. No. 09/150,147, filed Sep. 9, 1998 (now abandoned), which is a division of application Ser. No. 08/438,159, filed May 8, 1995 (now U.S. Pat. No. 5,850,481), which is a continuation-in-part of application Ser. No. 08/327,426, filed Oct. 21, 1994 (now U.S. Pat. No. 5,768,426). The software appendices published with U.S. Pat. No. 5,768,426 are incorporated herein by reference.

This application has essentially the same specification as application Ser. No. 08/327,426, but is supplemented by the following patent documents, which are incorporated by reference in their entireties:

Patent documents 20040008866, 20020147910 and U.S. Pat. No. 7,061,510, which disclose, e.g., various arrangements by which different portions of a content object can convey different payloads;

Patent documents 20030112974, 20050251683, 20040044894, 20040039914, 20050039020 and U.S. Pat. No. 7,020,304, which disclose, e.g., various arrangements by which plural watermarks can be successively applied to a content object; and Patent documents 20060031684, 20040181671, U.S. Pat. Nos. 6,614,914, 6,975,744, and 7,013,021, which concern, e.g., techniques that may be useful in certain steganographic systems.

TECHNICAL FIELD

The present technology relates to methods and systems employing steganographic processing.

BACKGROUND AND SUMMARY

"I would never put it in the power of any printer or publisher to suppress or alter a work of mine, by making him master of the copy"
 Thomas Paine, *Rights of Man,* 1792.
"The printer dares not go beyond his licensed copy"
 Milton, *Aeropagetica,* 1644.

Since time immemorial, unauthorized use and outright piracy of proprietary source material has been a source of lost revenue, confusion, and artistic corruption.

These historical problems have been compounded by the advent of digital technology. With it, the technology of copying materials and redistributing them in unauthorized manners has reached new heights of sophistication, and more importantly, omnipresence. Lacking objective means for comparing an alleged copy of material with the original, owners and possible litigation proceedings are left with a subjective opinion of whether the alleged copy is stolen, or has been used in an unauthorized manner. Furthermore, there is no simple means of tracing a path to an original purchaser of the material, something which can be valuable in tracing where a possible "leak" of the material first occurred.

A variety of methods for protecting commercial material have been attempted. One is to scramble signals via an encoding method prior to distribution, and descramble prior to use. This technique, however, requires that both the original and later descrambled signals never leave closed and controlled networks, lest they be intercepted and recorded. Furthermore, this arrangement is of little use in the broad field of mass marketing audio and visual material, where even a few dollars extra cost causes a major reduction in market, and where the signal must eventually be descrambled to be perceived, and thus can be easily recorded.

Another class of techniques relies on modification of source audio or video signals to include a subliminal identification signal, which can be sensed by electronic means. Examples of such systems are found in U.S. Pat. No. 4,972,471 and European patent publication EP 441,702, as well as in Komatsu et al, "Authentication System Using Concealed Image in Telematics," Memoirs of the School of Science & Engineering, Waseda University, No. 52, p. 45-60 (1988) (Komatsu uses the term "digital watermark" for this technique). An elementary introduction to these methods is found in the article "Digital Signatures," Byte Magazine, November, 1993, p. 309. These techniques have the common characteristic that deterministic signals with well defined patterns and sequences within the source material convey the identification information. For certain applications this is not a drawback. But in general, this is an inefficient form of embedding identification information for a variety of reasons: (a) the whole of the source material is not used; (b) deterministic patterns have a higher likelihood of being discovered and removed by a would-be pirate; and (c) the signals are not generally 'holographic' in that identifications may be difficult to make given only sections of the whole. ('Holographic' is used herein to refer to the property that the identification information is distributed globally throughout the coded signal, and can be fully discerned from an examination of even a fraction of the coded signal. Coding of this type is sometimes termed "distributed" herein.)

Among the cited references are descriptions of several programs which perform steganography—described in one document as " . . . the ancient art of hiding information in some otherwise inconspicuous information." These programs variously allow computer users to hide their own messages inside digital image files and digital audio files. All do so by toggling the least significant bit (the lowest order bit of a single data sample) of a given audio data stream or rasterized image. Some of these programs embed messages quite directly into the least significant bit, while other "pre-encrypt" or scramble a message first and then embed the encrypted data into the least significant bit.

Our current understanding of these programs is that they generally rely on error-free transmission of the of digital data in order to correctly transmit a given message in its entirety. Typically the message is passed only once, i.e., it is not repeated. These programs also seem to "take over" the least significant bit entirely, where actual data is obliterated and the message placed accordingly. This might mean that such codes could be easily erased by merely stripping off the least significant bit of all data values in a given image or audio file. It is these and other considerations which suggest that the only similarity between our work and the established art of steganography is in the placement of information into data files with minimal perceptibility. The specifics of embedding and the uses of that buried information diverge from there.

Another cited reference is U.S. Pat. No. 5,325,167 to Melen. In the service of authenticating a given document, the high precision scanning of that document reveals patterns and "microscopic grain structure" which apparently is a kind of unique fingerprint for the underlying document media, such as paper itself or post-applied materials such as toner. Melen further teaches that scanning and storing this fingerprint can later be used in authentication by scanning a purported document and comparing it to the original fingerprint. Applicant is aware of a similar idea employed in the very high precision recording of credit card magnetic strips, as reported in the Wall Street Journal but which cannot presently be located, wherein very fine magnetic fluxuations tend to be unique from one card to the next, so that credit card authentication could be achieved through pre-recording these fluxuations later to be compared to the recordings of the purportedly same credit card.

Both of the foregoing techniques appear to rest on the same identification principles on which the mature science of fingerprint analysis rests: the innate uniqueness of some localized physical property. These methods then rely upon a single judgment and/or measurement of "similarity" or "correlation" between a suspect and a pre-recording master. Though fingerprint analysis has brought this to a high art, these methods are nevertheless open to a claim that preparations of the samples, and the "filtering" and "scanner specifications" of Melen's patent, unavoidably tend to bias the resulting judgment of similarity, and would create a need for more esoteric "expert testimony" to explain the confidence of a found match or mis-match. Preferred embodiments of the present technology avoid this reliance on expert testimony and to place the confidence in a match into simple "coin flip" vernacular, i.e., what are the odds you can call the correct coin flip 16 times in a row. Attempts to identify fragments of a fingerprint, document, or otherwise, exacerbate this issue of confidence in a judgment, whereas various embodiments of the present technology seek to objectively apply the intuitive "coin flip" confidence to the smallest fragment possible. Also, storing unique fingerprints for each and every document or credit card magnetic strip, and having these fingerprints readily available for later cross-checking, should prove to be quite an economic undertaking. Various embodiments of the present technology allow for the "re-use" of noise codes and "snowy images" in the service of easing storage requirements.

U.S. Pat. No. 4,921,278 to Shiang et al. teaches a kind of spatial encryption technique wherein a signature or photograph is splayed out into what the untrained eye would refer to as noise, but which is actually a well defined structure referred to as Moiré patterns. The similarities of the present work to Shiang's system appear to be use of noise-like patterns which nevertheless carry information, and the use of this principle on credit cards and other identification cards.

Others of the cited patents deal with other techniques for identification and/or authentication of signals or media. U.S. Pat. No. 4,944,036 to Hyatt does not appear to be applicable to the present technology, but does point out that the term "signature" can be equally applied to signals which carry unique characteristics based on physical structure.

Despite the foregoing and other diverse work in the field of identification/authentication, there still remains a need for a reliable and efficient method for performing a positive identification between a copy of an original signal and the original. Desirably, this method should not only perform identification, it should also be able to convey source-version information in order to better pinpoint the point of sale. The method should not compromise the innate quality of material which is being sold, as does the placement of localized logos on images. The method should be robust so that an identification can be made even after multiple copies have been made and/or compression and decompression of the signal has taken place. The identification method should be largely uneraseable or "uncrackable." The method should be capable of working even on fractional pieces of the original signal, such as a 10 second "riff" of an audio signal or the "clipped and pasted" sub-section of an original image.

The existence of such a method would have profound consequences on piracy in that it could (a) cost effectively monitor for unauthorized uses of material and perform "quick checks"; (b) become a deterrent to unauthorized uses when the method is known to be in use and the consequences well publicized; and (c) provide unequivocal proof of identity, similar to fingerprint identification, in litigation, with potentially more reliability than that of fingerprinting.

In accordance with an exemplary embodiment of the below-detailed technology, an imperceptible identification code is embedded throughout a source signal. In one particular embodiment, this embedding is achieved by modulating the source signal with a small noise signal in a coded fashion. More particularly, bits of a binary identification code are referenced, one at a time, to control modulation of the source signal with the noise signal.

The copy with the embedded signal (the "encoded" copy) becomes the material which is sold, while the original is secured in a safe place. The new copy is nearly identical to the original except under the finest of scrutiny; thus, its commercial value is not compromised. After the new copy has been sold and distributed and potentially distorted by multiple copies, the present disclosure details methods for positively identifying any suspect signal against the original.

Among its other advantages, the preferred embodiments' use of identification signals which are global (holographic) and which mimic natural noise sources allows the maximization of identification signal energy, as opposed to merely having it present 'somewhere in the original material.' This allows the identification coding to be much more robust in the face of thousands of real world degradation processes and material transformations, such as cutting and cropping of imagery.

The foregoing and additional features and advantages will be more readily apparent from the following detailed description thereof, which proceeds with reference to the accompanying drawings.

BRIEF DESCRIPTION OF THE DRAWINGS

FIG. 2 is a general overview, with detailed description of steps, of the process of embedding an "imperceptible" identification signal onto another signal.

DETAILED DESCRIPTION

In the following discussion of an illustrative embodiment, the words "signal" and "image" are used interchangeably to refer to both one, two, and even beyond two dimensions of digital signal. Examples will routinely switch back and forth between a one dimensional audio-type digital signal and a two dimensional image-type digital signal.

Figure 1:
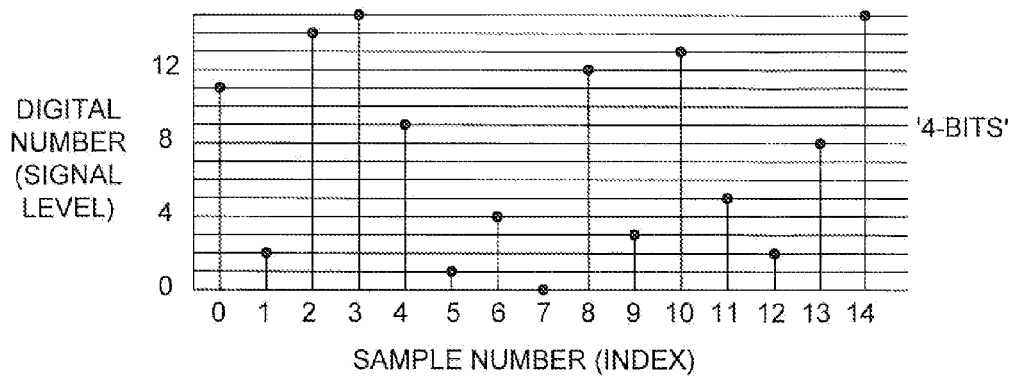
FIG. 1 is a simple and classic depiction of a one dimensional digital signal which is discretized in both axes.

In order to fully describe the details of an illustrative embodiment, it is necessary first to describe the basic properties of a digital signal. FIG. 1 shows a classic representation of a one dimensional digital signal. The x-axis defines the index numbers of sequence of digital "samples," and the y-axis is the instantaneous value of the signal at that sample, being constrained to exist only at a finite number of levels defined as the "binary depth" of a digital sample. The example depicted in FIG. 1 has the value of 2 to the fourth power, or "4 bits," giving 16 allowed states of the sample value.

For audio information such as sound waves, it is commonly accepted that the digitization process discretizes a continuous phenomena both in the time domain and in the signal level domain. As such, the process of digitization itself introduces a fundamental error source, in that it cannot record detail smaller than the discretization interval in either domain. The industry has referred to this, among other ways, as "aliasing" in the time domain, and "quantization noise" in the signal level domain. Thus, there will always be a basic error floor of a digital signal. Pure quantization noise, measured in a root mean square sense, is theoretically known to have the value of one over the square root of twelve, or about 0.29 DN, where DN stands for 'Digital Number' or the finest unit increment of the signal level. For example, a perfect 12-bit digitizer will have 4096 allowed DN with an innate root mean square noise floor of ~0.29 DN.

All known physical measurement processes add additional noise to the transformation of a continuous signal into the digital form. The quantization noise typically adds in quadrature (square root of the mean squares) to the "analog noise" of the measurement process, as it is sometimes referred to.

With almost all commercial and technical processes, the use of the decibel scale is used as a measure of signal and noise in a given recording medium. The expression "signal-to-noise ratio" is generally used, as it will be in this disclosure. As an example, this disclosure refers to signal to noise ratios in terms of signal power and noise power, thus 20 dB represents a 10 times increase in signal amplitude.

In summary, one particular embodiment embeds an N-bit value onto an entire signal through the addition of a very low amplitude encodation signal which has the look of pure noise. N is usually at least 8 and is capped on the higher end by ultimate signal-to-noise considerations and "bit error" in retrieving and decoding the N-bit value. As a practical matter, N is chosen based on application specific considerations, such as the number of unique different "signatures" that are desired. To illustrate, if N=128, then the number of unique digital signatures is in excess of $10^{38}$ ($2^{128}$). This number is believed to be more than adequate to both identify the material with sufficient statistical certainty and to index exact sale and distribution information.

The amplitude or power of this added signal is determined by the aesthetic and informational considerations of each and every application using the present methodology. For instance, non-professional video can stand to have a higher embedded signal level without becoming noticeable to the average human eye, while high precision audio may only be able to accept a relatively small signal level lest the human ear perceive an objectionable increase in "hiss." These statements are generalities and each application has its own set of criteria in choosing the signal level of the embedded identification signal. The higher the level of embedded signal, the more corrupted a copy can be and still be identified. On the other hand, the higher the level of embedded signal, the more objectionable the perceived noise might be, potentially impacting the value of the distributed material.

To illustrate the range of different applications to which the principles of the present technology can be applied, the present specification details two different systems. The first (termed, for lack of a better name, a "batch encoding" system), applies identification coding to an existing data signal. The second (termed, for lack of a better name, a "real time encoding" system), applies identification coding to a signal as it is produced. Those skilled in the art will recognize that the principles of the presently detailed technology can be applied in a number of other contexts in addition to these particularly described.

The discussions of these two systems can be read in either order. Some readers may find the latter more intuitive than the former; for others the contrary may be true.

Batch Encoding

The following discussion of a first class of embodiments is best prefaced by a section defining relevant terms:

The original signal refers to either the original digital signal or the high quality digitized copy of a non-digital original.

The N-bit identification word refers to a unique identification binary value, typically having N range anywhere from 8 to 128, which is the identification code ultimately placed onto the original signal via the disclosed transformation process. In the illustrated embodiment, each N-bit identification word begins with the sequence of values '0101,' which is used to determine an optimization of the signal-to-noise ratio in the identification procedure of a suspect signal (see definition below).

The m'th bit value of the N-bit identification word is either a zero or one corresponding to the value of the m'th place, reading left to right, of the N-bit word. E.g., the first (m=1) bit value of the N=8 identification word 01110100 is the value '0;' the second bit value of this identification word is '1', etc.

The m'th individual embedded code signal refers to a signal which has dimensions and extent precisely equal to the original signal (e.g. both are a 512 by 512 digital image), and which is (in the illustrated embodiment) an independent pseudo-random sequence of digital values. "Pseudo" pays homage to the difficulty in philosophically defining pure randomness, and also indicates that there are various acceptable ways of generating the "random" signal. There will be exactly N individual embedded code signals associated with any given original signal.

The acceptable perceived noise level refers to an application-specific determination of how much "extra noise," i.e. amplitude of the composite embedded code signal described next, can be added to the original signal and still have an acceptable signal to sell or otherwise distribute. This disclosure uses a 1 dB increase in noise as a typical value which might be acceptable, but this is quite arbitrary.

The composite embedded code signal refers to the signal which has dimensions and extent precisely equal to the original signal, (e.g. both are a 512 by 512 digital image), and which contains the addition and appropriate attenuation of the N individual embedded code signals. The individual embedded signals are generated on an arbitrary scale, whereas the amplitude of the composite signal must not exceed the pre-set acceptable perceived noise level, hence the need for "attenuation" of the N added individual code signals.

The distributable signal refers to the nearly similar copy of the original signal, consisting of the original signal plus the composite embedded code signal. This is the signal which is distributed to the outside community, having only slightly higher but acceptable "noise properties" than the original.

A suspect signal refers to a signal which has the general appearance of the original and distributed signal and whose potential identification match to the original is being questioned. The suspect signal is then analyzed to see if it matches the N-bit identification word.

The detailed methodology of this first embodiment begins by stating that the N-bit identification word is encoded onto the original signal by having each of the m bit values multiply their corresponding individual embedded code signals, the resultant being accumulated in the composite signal, the fully summed composite signal then being attenuated down to the acceptable perceived noise amplitude, and the resultant composite signal added to the original to become the distributable signal.

The original signal, the N-bit identification word, and all N individual embedded code signals are then stored away in a secured place. A suspect signal is then found. This signal may have undergone multiple copies, compressions and decompressions, resamplings onto different spaced digital signals, transfers from digital to analog back to digital media, or any combination of these items. IF the signal still appears similar to the original, i.e. its innate quality is not thoroughly destroyed by all of these transformations and noise additions, then depending on the signal to noise properties of the embedded signal, the identification process should function to some objective degree of statistical confidence. The extent of corruption of the suspect signal and the original acceptable perceived noise level are two key parameters in determining an expected confidence level of identification.

The identification process on the suspected signal begins by resampling and aligning the suspected signal onto the digital format and extent of the original signal. Thus, if an image has been reduced by a factor of two, it needs to be digitally enlarged by that same factor. Likewise, if a piece of music has been "cut out," but may still have the same sampling rate as the original, it is necessary to register this cut-out piece to the original, typically done by performing a local digital cross-correlation of the two signals (a common digital operation), finding at what delay value the correlation peaks, then using this found delay value to register the cut piece to a segment of the original.

Once the suspect signal has been sample-spacing matched and registered to the original, the signal levels of the suspect signal should be matched in an rms sense to the signal level of the original. This can be done via a search on the parameters of offset, amplification, and gamma being optimized by using the minimum of the mean squared error between the two signals as a function of the three parameters. We can call the suspect signal normalized and registered at this point, or just normalized for convenience.

The newly matched pair then has the original signal subtracted from the normalized suspect signal to produce a difference signal. The difference signal is then cross-correlated with each of the N individual embedded code signals and the peak cross-correlation value recorded. The first four bit code ('0101') is used as a calibrator both on the mean values of the zero value and the one value, and on further registration of the two signals if a finer signal to noise ratio is desired (i.e., the optimal separation of the 0101 signal will indicate an optimal registration of the two signals and will also indicate the probable existence of the N-bit identification signal being present.)

The resulting peak cross-correlation values will form a noisy series of floating point numbers which can be transformed into 0's and 1's by their proximity to the mean values of 0 and 1 found by the 0101 calibration sequence. If the suspect signal has indeed been derived from the original, the identification number resulting from the above process will match the N-bit identification word of the original, bearing in mind either predicted or unknown "bit error" statistics. Signal-to-noise considerations will determine if there will be some kind of "bit error" in the identification process, leading to a form of X % probability of identification where X might be desired to be 99.9% or whatever. If the suspect copy is indeed not a copy of the original, an essentially random sequence of 0's and 1's will be produced, as well as an apparent lack of separation of the resultant values. This is to say, if the resultant values are plotted on a histogram, the existence of the N-bit identification signal will exhibit strong bi-level characteristics, whereas the non-existence of the code, or the existence of a different code of a different original, will exhibit a type of random gaussian-like distribution. This histogram separation alone should be sufficient for an identification, but it is even stronger proof of identification when an exact binary sequence can be objectively reproduced.

Specific Example

Imagine that we have taken a valuable picture of two heads of state at a cocktail party, pictures which are sure to earn some reasonable fee in the commercial market. We desire to sell this picture and ensure that it is not used in an unauthorized or uncompensated manner. This and the following steps are summarized in FIG. 2.

Assume the picture is transformed into a positive color print. We first scan this into a digitized form via a normal high quality black and white scanner with a typical photometric spectral response curve. (It is possible to get better ultimate signal to noise ratios by scanning in each of the three primary colors of the color image, but this nuance is not central to describing the basic process.)

Let us assume that the scanned image now becomes a 4000 by 4000 pixel monochrome digital image with a grey scale accuracy defined by 12-bit grey values or 4096 allowed levels. We will call this the "original digital image" realizing that this is the same as our "original signal" in the above definitions.

During the scanning process we have arbitrarily set absolute black to correspond to digital value '30'. We estimate that there is a basic 2 Digital Number root mean square noise existing on the original digital image, plus a theoretical noise (known in the industry as "shot noise") of the square root of the brightness value of any given pixel. In formula, we have:

$$<\text{RMS Noise}_{n,m}>=\text{sqrt}(4+(V_{n,m}-30)) \tag{1}$$

Here, n and m are simple indexing values on rows and columns of the image ranging from 0 to 3999. Sqrt is the square root. V is the DN of a given indexed pixel on the original digital image. The < > brackets around the RMS noise merely indicates that this is an expected average value, where it is clear that each and every pixel will have a random error individually. Thus, for a pixel value having 1200 as a digital number or "brightness value", we find that its expected rms noise value is sqrt(1204)=34.70, which is quite close to 34.64, the square root of 1200.

We furthermore realize that the square root of the innate brightness value of a pixel is not precisely what the eye perceives as a minimum objectionable noise, thus we come up with the formula:

$$\langle \text{RMS Addable Noise}_{n,m} \rangle = X^*\text{sqrt}(4+(V_{n,m}-30)^{\wedge}Y) \qquad (2)$$

Where X and Y have been added as empirical parameters which we will adjust, and "addable" noise refers to our acceptable perceived noise level from the definitions above. We now intend to experiment with what exact value of X and Y we can choose, but we will do so at the same time that we are performing the next steps in the process.

The next step in our process is to choose N of our N-bit identification word. We decide that a 16 bit main identification value with its 65536 possible values will be sufficiently large to identify the image as ours, and that we will be directly selling no more than 128 copies of the image which we wish to track, giving 7 bits plus an eighth bit for an odd/even adding of the first 7 bits (i.e. an error checking bit on the first seven). The total bits required now are at 4 bits for the 0101 calibration sequence, 16 for the main identification, 8 for the version, and we now throw in another 4 as a further error checking value on the first 28 bits, giving 32 bits as N. The final 4 bits can use one of many industry standard error checking methods to choose its four values.

We now randomly determine the 16 bit main identification number, finding for example, 1101 0001 1001 1110; our first versions of the original sold will have all 0's as the version identifier, and the error checking bits will fall out where they may. We now have our unique 32 bit identification word which we will embed on the original digital image.

To do this, we generate 32 independent random 4000 by 4000 encoding images for each bit of our 32 bit identification word. The manner of generating these random images is revealing. There are numerous ways to generate these. By far the simplest is to turn up the gain on the same scanner that was used to scan in the original photograph, only this time placing a pure black image as the input, then scanning this 32 times. The only drawback to this technique is that it does require a large amount of memory and that "fixed pattern" noise will be part of each independent "noise image." But, the fixed pattern noise can be removed via normal "dark frame" subtraction techniques. Assume that we set the absolute black average value at digital number '100,' and that rather than finding a 2 DN rms noise as we did in the normal gain setting, we now find an rms noise of 10 DN about each and every pixel's mean value.

We next apply a mid-spatial-frequency bandpass filter (spatial convolution) to each and every independent random image, essentially removing the very high and the very low spatial frequencies from them. We remove the very low frequencies because simple real-world error sources like geometrical warping, splotches on scanners, mis-registrations, and the like will exhibit themselves most at lower frequencies also, and so we want to concentrate our identification signal at higher spatial frequencies in order to avoid these types of corruptions. Likewise, we remove the higher frequencies because multiple generation copies of a given image, as well as compression-decompression transformations, tend to wipe out higher frequencies anyway, so there is no point in placing too much identification signal into these frequencies if they will be the ones most prone to being attenuated. Therefore, our new filtered independent noise images will be dominated by mid-spatial frequencies. On a practical note, since we are using 12-bit values on our scanner and we have removed the DC value effectively and our new rms noise will be slightly less than 10 digital numbers, it is useful to boil this down to a 6-bit value ranging from −32 through 0 to 31 as the resultant random image.

Next we add all of the random images together which have a '1' in their corresponding bit value of the 32-bit identification word, accumulating the result in a 16-bit signed integer image. This is the unattenuated and un-scaled version of the composite embedded signal.

Next we experiment visually with adding the composite embedded signal to the original digital image, through varying the X and Y parameters of equation 2. In formula, we visually iterate to both maximize X and to find the appropriate Y in the following:

$$V_{dist;n,m} = V_{orig;n,m} + V_{comp;n,m} * X^* \text{sqrt}(4+V_{orig;n,m}^{\wedge}Y) \qquad (3)$$

where dist refers to the candidate distributable image, i.e. we are visually iterating to find what X and Y will give us an acceptable image; orig refers to the pixel value of the original image; and comp refers to the pixel value of the composite image. The n's and m's still index rows and columns of the image and indicate that this operation is done on all 4000 by 4000 pixels. The symbol V is the DN of a given pixel and a given image.

As an arbitrary assumption, now, we assume that our visual experimentation has found that the value of X=0.025 and Y=0.6 are acceptable values when comparing the original image with the candidate distributable image. This is to say, the distributable image with the "extra noise" is acceptably close to the original in an aesthetic sense. Note that since our individual random images had a random rms noise value around 10 DN, and that adding approximately 16 of these images together will increase the composite noise to around 40 DN, the X multiplication value of 0.025 will bring the added rms noise back to around 1 DN, or half the amplitude of our innate noise on the original. This is roughly a 1 dB gain in noise at the dark pixel values and correspondingly more at the brighter values modified by the Y value of 0.6.

So with these two values of X and Y, we now have constructed our first versions of a distributable copy of the original. Other versions will merely create a new composite signal and possibly change the X slightly if deemed necessary. We now lock up the original digital image along with the 32-bit identification word for each version, and the 32 independent random 4-bit images, waiting for our first case of a suspected piracy of our original. Storage wise, this is about 14 Megabytes for the original image and 32*0.5 bytes*16 million=~256 Megabytes for the random individual encoded images. This is quite acceptable for a single valuable image. Some storage economy can be gained by simple lossless compression.

Finding a Suspected Piracy of our Image

Figure 3:
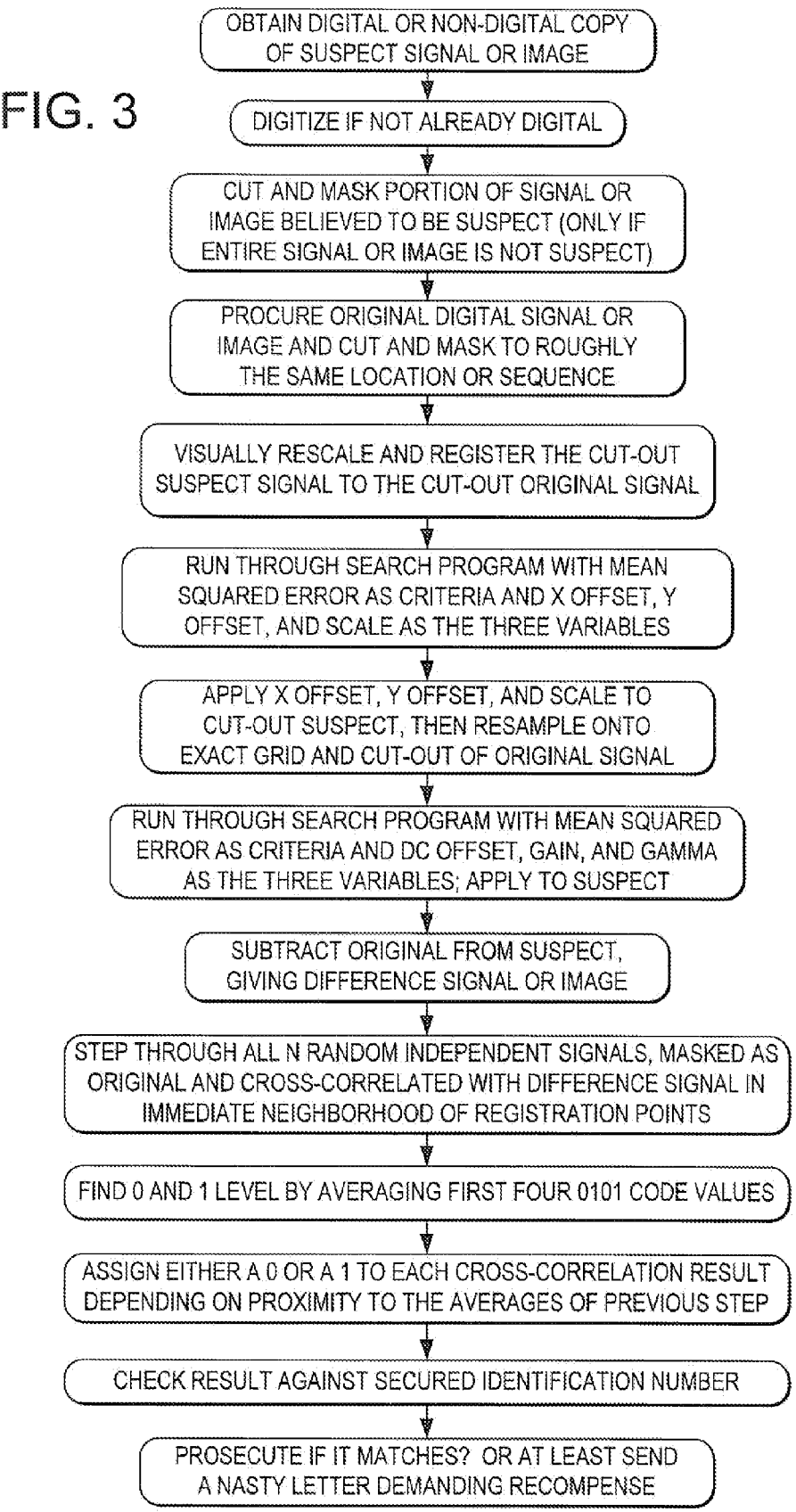
FIG. 3 is a step-wise description of how a suspected copy of an original is identified.

We sell our image and several months later find our two heads of state in the exact poses we sold them in, seemingly cut and lifted out of our image and placed into another stylized background scene. This new "suspect" image is being printed in 100,000 copies of a given magazine issue, let us say. We now go about determining if a portion of our original image has indeed been used in an unauthorized manner. FIG. 3 summarizes the details.

The first step is to take an issue of the magazine, cut out the page with the image on it, then carefully but not too carefully cut out the two figures from the background image using ordinary scissors. If possible, we will cut out only one connected piece rather than the two figures separately. We paste this onto a black background and scan this into a digital form. Next we electronically flag or mask out the black background, which is easy to do by visual inspection.

We now procure the original digital image from our secured place along with the 32-bit identification word and the 32 individual embedded images. We place the original digital image onto our computer screen using standard image manipulation software, and we roughly cut along the same borders as our masked area of the suspect image, masking this image at the same time in roughly the same manner. The word 'roughly' is used since an exact cutting is not needed, it merely aids the identification statistics to get it reasonably close.

Next we rescale the masked suspect image to roughly match the size of our masked original digital image, that is, we digitally scale up or down the suspect image and roughly overlay it on the original image. Once we have performed this rough registration, we then throw the two images into an automated scaling and registration program. The program performs a search on the three parameters of x position, y position, and spatial scale, with the figure of merit being the mean squared error between the two images given any given scale variable and x and y offset. This is a fairly standard image processing methodology. Typically this would be done using generally smooth interpolation techniques and done to sub-pixel accuracy. The search method can be one of many, where the simplex method is a typical one.

Once the optimal scaling and x-y position variables are found, next comes another search on optimizing the black level, brightness gain, and gamma of the two images. Again, the figure of merit to be used is mean squared error, and again the simplex or other search methodologies can be used to optimize the three variables. After these three variables are optimized, we apply their corrections to the suspect image and align it to exactly the pixel spacing and masking of the original digital image and its mask. We can now call this the standard mask.

The next step is to subtract the original digital image from the newly normalized suspect image only within the standard mask region. This new image is called the difference image.

Then we step through all 32 individual random embedded images, doing a local cross-correlation between the masked difference image and the masked individual embedded image. 'Local' refers to the idea that one need only start correlating over an offset region of +/−1 pixels of offset between the nominal registration points of the two images found during the search procedures above. The peak correlation should be very close to the nominal registration point of 0,0 offset, and we can add the 3 by 3 correlation values together to give one grand correlation value for each of the 32 individual bits of our 32-bit identification word.

After doing this for all 32 bit places and their corresponding random images, we have a quasi-floating point sequence of 32 values. The first four values represent our calibration signal of 0101. We now take the mean of the first and third floating point value and call this floating point value '0,' and we take the mean of the second and the fourth value and call this floating point value '1.' We then step through all remaining 28 bit values and assign either a '0' or a '1' based simply on which mean value they are closer to. Stated simply, if the suspect image is indeed a copy of our original, the embedded 32-bit resulting code should match that of our records, and if it is not a copy, we should get general randomness. The third and the fourth possibilities of 3) Is a copy but doesn't match identification number and 4) isn't a copy but does match are, in the case of 3), possible if the signal to noise ratio of the process has plummeted, i.e. the 'suspect image' is truly a very poor copy of the original, and in the case of 4) is basically one chance in four billion since we were using a 32-bit identification number. If we are truly worried about 4), we can just have a second independent lab perform their own tests on a different issue of the same magazine. Finally, checking the error-check bits against what the values give is one final and possibly overkill check on the whole process. In situations where signal to noise is a possible problem, these error checking bits might be eliminated without too much harm.

Benefits

Now that a full description of the first embodiment has been described via a detailed example, it is appropriate to point out the rationale of some of the process steps and their benefits.

The ultimate benefits of the foregoing process are that obtaining an identification number is fully independent of the manners and methods of preparing the difference image. That is to say, the manners of preparing the difference image, such as cutting, registering, scaling, etcetera, cannot increase the odds of finding an identification number when none exists; it only helps the signal-to-noise ratio of the identification process when a true identification number is present. Methods of preparing images for identification can be different from each other even, providing the possibility for multiple independent methodologies for making a match.

The ability to obtain a match even on sub-sets of the original signal or image is a key point in today's information-rich world. Cutting and pasting both images and sound clips is becoming more common, allowing such an embodiment to be used in detecting a copy even when original material has been thus corrupted. Finally, the signal to noise ratio of matching should begin to become difficult only when the copy material itself has been significantly altered either by noise or by significant distortion; both of these also will affect that copy's commercial value, so that trying to thwart the system can only be done at the expense of a huge decrease in commercial value.

The fullest expression of the present system will come when it becomes an industry standard and numerous independent groups set up with their own means or 'in-house' brand of applying embedded identification numbers and in their decipherment. Numerous independent group identification will further enhance the ultimate objectivity of the method, thereby enhancing its appeal as an industry standard.

Use of True Polarity in Creating the Composite Embedded Code Signal

The foregoing discussion made use of the 0 and 1 formalism of binary technology to accomplish its ends. Specifically, the 0's and 1's of the N-bit identification word directly multiplied their corresponding individual embedded code signal to form the composite embedded code signal (step 8, FIG. 2). This approach certainly has its conceptual simplicity, but the multiplication of an embedded code signal by 0 along with the storage of that embedded code contains a kind of inefficiency.

It is preferred to maintain the formalism of the 0 and 1 nature of the N-bit identification word, but to have the 0's of the word induce a subtraction of their corresponding embedded code signal. Thus, in step 8 of FIG. 2, rather than only 'adding' the individual embedded code signals which correspond to a '1' in the N-bit identification word, we will also 'subtract' the individual embedded code signals which correspond to a '0' in the N-bit identification word.

At first glance this seems to add more apparent noise to the final composite signal. But it also increases the energy-wise separation of the 0's from the 1's, and thus the 'gain' which is applied in step 10, FIG. 2 can be correspondingly lower.

We can refer to this improvement as the use of true polarity. The main advantage of this improvement can largely be summarized as 'informational efficiency.'

'Perceptual Orthogonality' of the Individual Embedded Code Signals

The foregoing discussion contemplates the use of generally random noise-like signals as the individual embedded code signals. This is perhaps the simplest form of signal to generate. However, there is a form of informational optimization which can be applied to the set of the individual embedded signals, which the applicant describes under the rubric 'perceptual orthogonality.' This term is loosely based on the mathematical concept of the orthogonality of vectors, with the current additional requirement that this orthogonality should maximize the signal energy of the identification information while maintaining it below some perceptibility threshold. Put another way, the embedded code signals need not necessarily be random in nature.

Use and Improvements of the First Embodiment in the Field of Emulsion-Based Photography The foregoing discussion outlined techniques that are applicable to photographic materials. The following section explores the details of this area further and discloses certain improvements which lend themselves to a broad range of applications.

The first area to be discussed involves the pre-application or pre-exposing of a serial number onto traditional photographic products, such as negative film, print paper, transparencies, etc. In general, this is a way to embed a priori unique serial numbers (and by implication, ownership and tracking information) into photographic material. The serial numbers themselves would be a permanent part of the normally exposed picture, as opposed to being relegated to the margins or stamped on the back of a printed photograph, which all require separate locations and separate methods of copying. The 'serial number' as it is called here is generally synonymous with the N-bit identification word, only now we are using a more common industrial terminology.

In FIG. 2, step 11, the disclosure calls for the storage of the "original [image]" along with code images. Then in FIG. 3, step 9, it directs that the original be subtracted from the suspect image, thereby leaving the possible identification codes plus whatever noise and corruption has accumulated. Therefore, the previous disclosure made the tacit assumption that there exists an original without the composite embedded signals.

Now in the case of selling print paper and other duplication film products, this will still be the case, i.e., an "original" without the embedded codes will indeed exist and the basic methodology of the first embodiment can be employed. The original film serves perfectly well as an 'unencoded original.'

However, in the case where pre-exposed negative film is used, the composite embedded signal pre-exists on the original film and thus there will never be an "original" separate from the pre-embedded signal. It is this latter case, therefore, which will be examined a bit more closely, along with observations on how to best use the principles discussed above (the former cases adhering to the previously outlined methods).

The clearest point of departure for the case of pre-numbered negative film, i.e. negative film which has had each and every frame pre-exposed with a very faint and unique composite embedded signal, comes at step 9 of FIG. 3 as previously noted. There are certainly other differences as well, but they are mostly logistical in nature, such as how and when to embed the signals on the film, how to store the code numbers and serial number, etc. Obviously the pre-exposing of film would involve a major change to the general mass production process of creating and packaging film.

Figure 4:
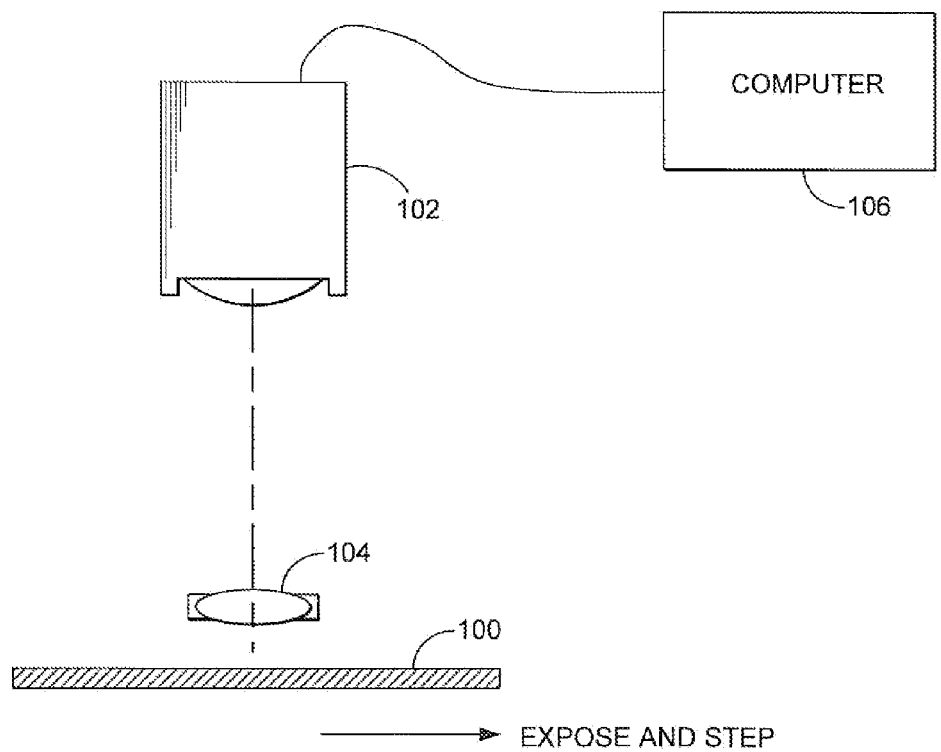
FIG. 4 is a schematic view of an apparatus for pre-exposing film with identification information in accordance with another embodiment.

FIG. 4 has a schematic outlining one potential post-hoc mechanism for pre-exposing film. 'Post-hoc' refers to applying a process after the full common manufacturing process of film has already taken place. Eventually, economies of scale may dictate placing this pre-exposing process directly into the chain of manufacturing film. Depicted in FIG. 4 is what is commonly known as a film writing system. The computer, 106, displays the composite signal produced in step 8, FIG. 2, on its phosphor screen. A given frame of film is then exposed by imaging this phosphor screen, where the exposure level is generally very faint, i.e. generally imperceptible. Clearly, the marketplace will set its own demands on how faint this should be, that is, the level of added 'graininess' as practitioners would put it. Each frame of film is sequentially exposed, where in general the composite image displayed on the CRT 102 is changed for each and every frame, thereby giving each frame of film a different serial number. The transfer lens 104 highlights the focal conjugate planes of a film frame and the CRT face.

Getting back to the applying the principles of the foregoing embodiment in the case of pre-exposed negative film . . . . At step 9, FIG. 3, if we were to subtract the "original" with its embedded code, we would obviously be "erasing" the code as well since the code is an integral part of the original. Fortunately, remedies do exist and identifications can still be made. However, it will be a challenge to artisans who refine this embodiment to have the signal to noise ratio of the identification process in the pre-exposed negative case approach the signal to noise ratio of the case where the un-encoded original exists.

A succinct definition of the problem is in order at this point. Given a suspect picture (signal), find the embedded identification code IF a code exists at al. The problem reduces to one of finding the amplitude of each and every individual embedded code signal within the suspect picture, not only within the context of noise and corruption as was previously explained, but now also within the context of the coupling between a captured image and the codes. 'Coupling' here refers to the idea that the captured image "randomly biases" the cross-correlation.

So, bearing in mind this additional item of signal coupling, the identification process now estimates the signal amplitude of each and every individual embedded code signal (as opposed to taking the cross-correlation result of step 12, FIG. 3). If our identification signal exists in the suspect picture, the amplitudes thus found will split into a polarity with positive amplitudes being assigned a '1' and negative amplitudes being assigned a '0'. Our unique identification code manifests itself. If, on the other hand, no such identification code exists or it is someone else's code, then a random gaussian-like distribution of amplitudes is found with a random hash of values.

It remains to provide a few more details on how the amplitudes of the individual embedded codes are found. Again, fortunately, this exact problem has been treated in other technological applications. Besides, throw this problem and a little food into a crowded room of mathematicians and statisticians and surely a half dozen optimized methodologies will pop out after some reasonable period of time. It is a rather cleanly defined problem.

One specific example solution comes from the field of astronomical imaging. Here, it is a mature prior art to subtract out a "thermal noise frame" from a given CCD image of an object. Often, however, it is not precisely known what scaling factor to use in subtracting the thermal frame, and a search for the correct scaling factor is performed. This is precisely the task of this step of the present embodiment.

General practice merely performs a common search algorithm on the scaling factor, where a scaling factor is chosen and a new image is created according to:

$$\text{NEW IMAGE} = \text{ACQUIRED IMAGE} - \text{SCALE} * \text{THERMAL IMAGE} \qquad (4)$$

The new image is applied to the fast Fourier transform routine and a scale factor is eventually found which minimizes the integrated high frequency content of the new image. This general type of search operation with its minimization of a particular quantity is exceedingly common. The scale factor thus found is the sought-for "amplitude." Refinements which are contemplated but not yet implemented are where the coupling of the higher derivatives of the acquired image and the embedded codes are estimated and removed from the calculated scale factor. In other words, certain bias effects from the coupling mentioned earlier are present and should be eventually accounted for and removed both through theoretical and empirical experimentation.

Use and Improvements in the Detection of Signal or Image Alteration

Apart from the basic need of identifying a signal or image as a whole, there is also a rather ubiquitous need to detect possible alterations to a signal or image. The following section describes how the foregoing embodiment, with certain modifications and improvements, can be used as a powerful tool in this area. The potential scenarios and applications of detecting alterations are innumerable.

To first summarize, assume that we have a given signal or image which has been positively identified using the basic methods outlined above. In other words, we know its N-bit identification word, its individual embedded code signals, and its composite embedded code. We can then fairly simply create a spatial map of the composite code's amplitude within our given signal or image. Furthermore, we can divide this amplitude map by the known composite code's spatial amplitude, giving a normalized map, i.e. a map which should fluctuate about some global mean value. By simple examination of this map, we can visually detect any areas which have been significantly altered wherein the value of the normalized amplitude dips below some statistically set threshold based purely on typical noise and corruption (error).

The details of implementing the creation of the amplitude map have a variety of choices. One is to perform the same procedure which is used to determine the signal amplitude as described above, only now we step and repeat the multiplication of any given area of the signal/image with a gaussian weight function centered about the area we are investigating.

Universal Versus Custom Codes

The disclosure thus far has outlined how each and every source signal has its own unique set of individual embedded code signals. This entails the storage of a significant amount of additional code information above and beyond the original, and many applications may merit some form of economizing.

One such approach to economizing is to have a given set of individual embedded code signals be common to a batch of source materials. For example, one thousand images can all utilize the same basic set of individual embedded code signals. The storage requirements of these codes then become a small fraction of the overall storage requirements of the source material.

Furthermore, some applications can utilize a universal set of individual embedded code signals, i.e., codes which remain the same for all instances of distributed material. This type of requirement would be seen by systems which wish to hide the N-bit identification word itself, yet have standardized equipment be able to read that word. This can be used in systems which make go/no go decisions at point-of-read locations. The potential drawback to this set-up is that the universal codes are more prone to be sleuthed or stolen; therefore they will not be as secure as the apparatus and methodology of the previously disclosed arrangement. Perhaps this is just the difference between 'high security' and 'air-tight security,' a distinction carrying little weight with the bulk of potential applications.

Use in Printing, Paper, Documents, Plastic Coated Identification Cards, and Other Material Where Global Embedded Codes can be Imprinted The term 'signal' is often used narrowly to refer to digital data information, audio signals, images, etc. A broader interpretation of 'signal,' and the one more generally intended, includes any form of modulation of any material whatsoever. Thus, the micro-topology of a piece of common paper becomes a 'signal' (e.g. it height as a function of x-y coordinates). The reflective properties of a flat piece of plastic (as a function of space also) becomes a signal. The point is that photographic emulsions, audio signals, and digitized information are not the only types of signals capable of utilizing the principles of the present technology.

As a case in point, a machine very much resembling a Braille printing machine can be designed so as to imprint unique 'noise-like' indentations as outlined above. These indentations can be applied with a pressure which is much smaller than is typically applied in creating Braille, to the point where the patterns are not noticed by a normal user of the paper. But by following the steps of the present disclosure and applying them via the mechanism of micro-indentations, a unique identification code can be placed onto any given sheet of paper, be it intended for everyday stationary purposes, or be it for important documents, legal tender, or other secured material.

The reading of the identification material in such an embodiment generally proceeds by merely reading the document optically at a variety of angles. This would become an inexpensive method for deducing the micro-topology of the paper surface. Certainly other forms of reading the topology of the paper are possible as well.

In the case of plastic encased material such as identification cards, e.g. driver's licenses, a similar Braille-like impressions machine can be utilized to imprint unique identification codes. Subtle layers of photoreactive materials can also be embedded inside the plastic and 'exposed.'

It is clear that wherever a material exists which is capable of being modulated by 'noise-like' signals, that material is an appropriate carrier for unique identification codes and utilization of the principles of the present technology. All that remains is the matter of economically applying the identification information and maintaining the signal level below an acceptability threshold which each and every application will define for itself.

APPENDIX A DESCRIPTION

Appendix A to U.S. Pat. No. 5,768,426 contains the source code of an implementation and verification of the foregoing embodiment for an 8-bit black and white imaging system.

Real Time Encoder

While the first class of embodiments most commonly employs a standard microprocessor or computer to perform the encodation of an image or signal, it is possible to utilize a custom encodation device which may be faster than a typical Von Neumann-type processor. Such a system can be utilized with all manner of serial data streams.

Music and videotape recordings are examples of serial data streams—data streams which are often pirated. It would assist enforcement efforts if authorized recordings were encoded with identification data so that pirated knock-offs could be traced to the original from which they were made.

Piracy is but one concern driving the need for the present technology. Another is authentication. Often it is important to confirm that a given set of data is really what it is purported to be (often several years after its generation).

Figure 5:
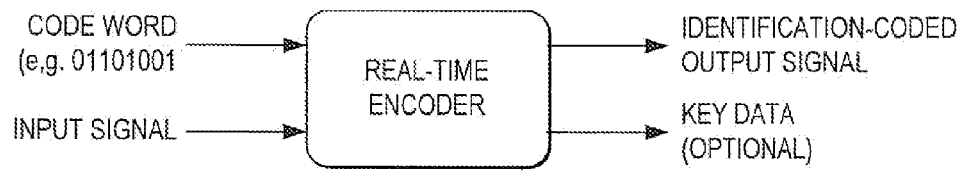
FIG. 5 is a diagram of a "black box" embodiment.

To address these and other needs, the system 200 of FIG. 5 can be employed. System 200 can be thought of as an identification coding black box 202. The system 200 receives an input signal (sometimes termed the "master" or "unencoded" signal) and a code word, and produces (generally in real time) an identification-coded output signal. (Usually, the system provides key data for use in later decoding.)

Figure 6:
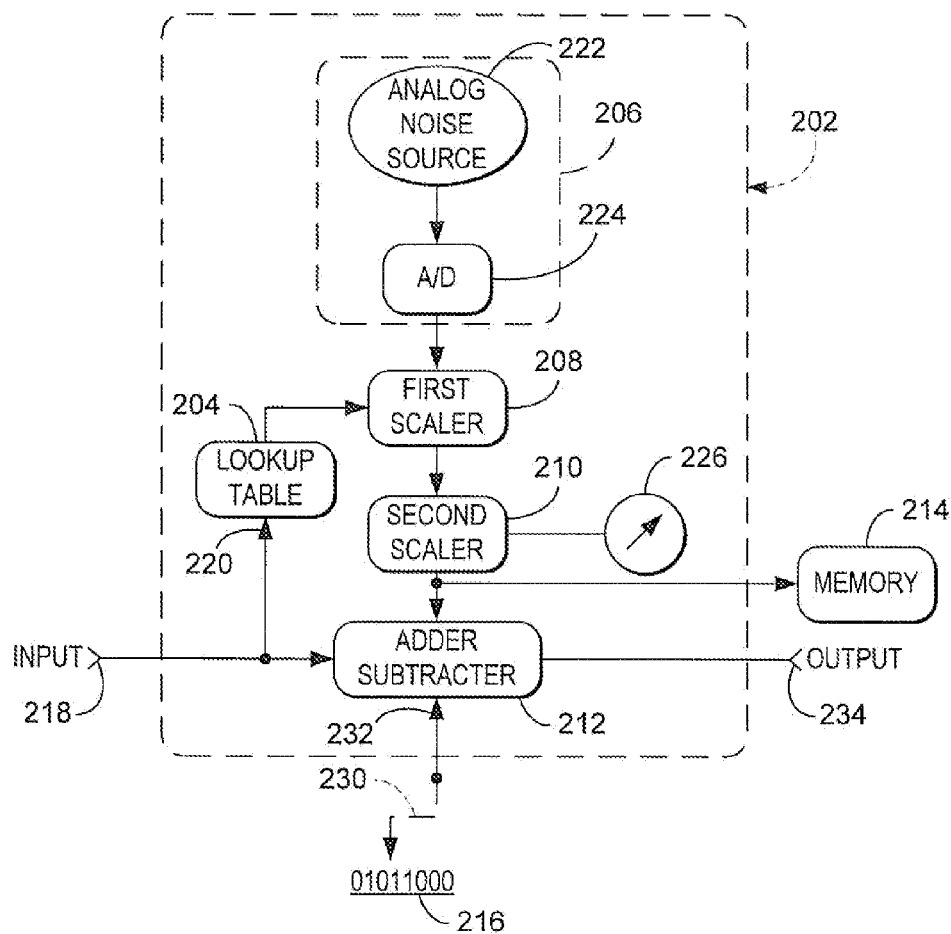
FIG. 6 is a schematic block diagram of the embodiment of FIG. 5.

The contents of the "black box" 202 can take various forms. An exemplary black box system is shown in FIG. 6 and includes a look-up table 204, a digital noise source 206, first and second scalers 208, 210, an adder/subtracter 212, a memory 214, and a register 216.

The input signal (which in the illustrated embodiment is an 8-20 bit data signal provided at a rate of one million samples per second, but which in other embodiments could be an analog signal if appropriate A/D and D/A conversion is provided) is applied from an input 218 to the address input 220 of the look-up table 204. For each input sample (i.e. look-up table address), the table provides a corresponding 8-bit digital output word. This output word is used as a scaling factor that is applied to one input of the first scaler 208.

The first scaler 208 has a second input, to which is applied an 8-bit digital noise signal from source 206. (In the illustrated embodiment, the noise source 206 comprises an analog noise source 222 and an analog-to-digital converter 224 although, again, other implementations can be used.) The noise source in the illustrated embodiment has a zero mean output value, with a full width half maximum (FWHM) of 50-100 digital numbers (e.g. from −75 to +75).

The first scaler 208 multiplies the two 8-bit words at its inputs (scale factor and noise) to produce—for each sample of the system input signal—a 16-bit output word. Since the noise signal has a zero mean value, the output of the first scaler likewise has a zero mean value.

The output of the first scaler 208 is applied to the input of the second scaler 210. The second scaler serves a global scaling function, establishing the absolute magnitude of the identification signal that will ultimately be embedded into the input data signal. The scaling factor is set through a scale control device 226 (which may take a number of forms, from a simple rheostat to a graphically implemented control in a graphical user interface), permitting this factor to be changed in accordance with the requirements of different applications. The second scaler 210 provides on its output line 228 a scaled noise signal. Each sample of this scaled noise signal is successively stored in the memory 214.

(In the illustrated embodiment, the output from the first scaler 208 may range between −1500 and +1500 (decimal), while the output from the second scaler 210 is in the low single digits, (such as between −2 and +2).)

Register 216 stores a multi-bit identification code word. In the illustrated embodiment this code word consists of 8 bits, although larger code words (up to hundreds of bits) are commonly used. These bits are referenced, one at a time, to control how the input signal is modulated with the scaled noise signal.

In particular, a pointer 230 is cycled sequentially through the bit positions of the code word in register 216 to provide a control bit of "0" or "1" to a control input 232 of the adder/subtracter 212. If, for a particular input signal sample, the control bit is a "1", the scaled noise signal sample on line 232 is added to the input signal sample. If the control bit is a "0", the scaled noise signal sample is subtracted from the input signal sample. The output 234 from the adder/subtracter 212 provides the black box's output signal.

The addition or subtraction of the scaled noise signal in accordance with the bits of the code word effects a modulation of the input signal that is generally imperceptible. However, with knowledge of the contents of the memory 214, a user can later decode the encoding, determining the code number used in the original encoding process. (Actually, use of memory 214 is optional, as explained below.)

It will be recognized that the encoded signal can be distributed in well known ways, including converted to printed image form, stored on magnetic media (floppy diskette, analog or DAT tape, etc.), CD-ROM, etc. etc.

Decoding

A variety of techniques can be used to determine the identification code with which a suspect signal has been encoded. Two are discussed below. The first is less preferable than the latter for most applications, but is discussed herein so that the reader may have a fuller context within which to understand the present technology.

More particularly, the first decoding method is a difference method, relying on subtraction of corresponding samples of the original signal from the suspect signal to obtain difference samples, which are then examined (typically individually) for deterministic coding indicia (i.e. the stored noise data). This approach may thus be termed a "sample-based, deterministic" decoding technique.

The second decoding method does not make use of the original signal. Nor does it examine particular samples looking for predetermined noise characteristics. Rather, the statistics of the suspect signal (or a portion thereof) are considered in the aggregate and analyzed to discern the presence of identification coding that permeates the entire signal. The reference to permeation means the entire identification code can be discerned from a small fragment of the suspect signal. This latter approach may thus be termed a "holographic, statistical" decoding technique.

Both of these methods begin by registering the suspect signal to match the original. This entails scaling (e.g. in amplitude, duration, color balance, etc.), and sampling (or resampling) to restore the original sample rate. As in the earlier described embodiment, there are a variety of well understood techniques by which the operations associated with this registration function can be performed.

As noted, the first decoding approach proceeds by subtracting the original signal from the registered, suspect signal, leaving a difference signal. The polarity of successive difference signal samples can then be compared with the polarities of the corresponding stored noise signal samples to determine the identification code. That is, if the polarity of the first difference signal sample matches that of the first noise signal sample, then the first bit of the identification code is a "1." (In such case, the polarity of the 9th, 17th, 25th, etc. samples should also all be positive.) If the polarity of the first difference signal sample is opposite that of the corresponding noise signal sample, then the first bit of the identification code is a "0."

By conducting the foregoing analysis with eight successive samples of the difference signal, the sequence of bits that comprise the original code word can be determined. If, as in the preferred embodiment, pointer 230 stepped through the code word one bit at a time, beginning with the first bit, during encoding, then the first 8 samples of the difference signal can be analyzed to uniquely determine the value of the 8-bit code word.

In a noise-free world (speaking here of noise independent of that with which the identification coding is effected), the foregoing analysis would always yield the correct identification code. But a process that is only applicable in a noise-free world is of limited utility indeed.

(Further, accurate identification of signals in noise-free contexts can be handled in a variety of other, simpler ways: e.g. checksums; statistically improbable correspondence between suspect and original signals; etc.)

While noise-induced aberrations in decoding can be dealt with—to some degree—by analyzing large portions of the signal, such aberrations still place a practical ceiling on the confidence of the process. Further, the villain that must be confronted is not always as benign as random noise. Rather, it increasingly takes the form of human-caused corruption, distortion, manipulation, etc. In such cases, the desired degree of identification confidence can only be achieved by other approaches.

The presently preferred approach (the "holographic, statistical" decoding technique) relies on recombining the suspect signal with certain noise data (typically the data stored in memory 214), and analyzing the entropy of the resulting signal. "Entropy" need not be understood in its most strict mathematical definition, it being merely the most concise word to describe randomness (noise, smoothness, snowiness, etc.).

Most serial data signals are not random. That is, one sample usually correlates—to some degree—with the adjacent samples. Noise, in contrast, typically is random. If a random signal (e.g. noise) is added to (or subtracted from) a non-random signal, the entropy of the resulting signal generally increases. That is, the resulting signal has more random variations than the original signal. This is the case with the encoded output signal produced by the present encoding process; it has more entropy than the original, unencoded signal.

If, in contrast, the addition of a random signal to (or subtraction from) a non-random signal reduces entropy, then something unusual is happening. It is this anomaly that the preferred decoding process uses to detect embedded identification coding.

To fully understand this entropy-based decoding method, it is first helpful to highlight a characteristic of the original encoding process: the similar treatment of every eighth sample.

In the encoding process discussed above, the pointer 230 increments through the code word, one bit for each successive sample of the input signal. If the code word is eight bits in length, then the pointer returns to the same bit position in the code word every eighth signal sample. If this bit is a "1", noise is added to the input signal; if this bit is a "0", noise is subtracted from the input signal. Due to the cyclic progression of the pointer 230, every eighth sample of an encoded signal thus shares a characteristic: they are all either augmented by the corresponding noise data (which may be negative), or they are all diminished, depending on whether the bit of the code word then being addressed by pointer 230 is a "1" or a "0".

To exploit this characteristic, the entropy-based decoding process treats every eighth sample of the suspect signal in like fashion. In particular, the process begins by adding to the 1st, 9th, 17th, 25th, etc. samples of the suspect signal the corresponding scaled noise signal values stored in the memory 214 (i.e. those stored in the 1st, 9th, 17th, 25th, etc., memory locations, respectively). The entropy of the resulting signal (i.e. the suspect signal with every 8th sample modified) is then computed.

(Computation of a signal's entropy or randomness is well understood by artisans in this field. One generally accepted technique is to take the derivative of the signal at each sample point, square these values, and then sum over the entire signal. However, a variety of other well known techniques can alternatively be used.)

The foregoing step is then repeated, this time subtracting the stored noise values from the 1st, 9th, 17th, 25 etc. suspect signal samples.

One of these two operations will undo the encoding process and reduce the resulting signal's entropy; the other will aggravate it. If adding the noise data in memory 214 to the suspect signal reduces its entropy, then this data must earlier have been subtracted from the original signal. This indicates that pointer 230 was pointing to a "0" bit when these samples were encoded. (A "0" at the control input of adder/subtracter 212 caused it to subtract the scaled noise from the input signal.)

Conversely, if subtracting the noise data from every eighth sample of the suspect signal reduces its entropy, then the encoding process must have earlier added this noise. This indicates that pointer 230 was pointing to a "1" bit when samples 1, 9, 17, 25, etc., were encoded.

By noting whether entropy decreases by (a) adding or (b) subtracting the stored noise data to/from the suspect signal, it can be determined that the first bit of the code word is (a) a "0", or (b) a "1".

The foregoing operations are then conducted for the group of spaced samples of the suspect signal beginning with the second sample (i.e. 2, 10, 18, 26 . . . ). The entropy of the resulting signals indicate whether the second bit of the code word is a "0" or a "1". Likewise with the following 6 groups of spaced samples in the suspect signal, until all 8 bits of the code word have been discerned.

It will be appreciated that the foregoing approach is not sensitive to corruption mechanisms that alter the values of individual samples; instead, the process considers the entropy of the signal as a whole, yielding a high degree of confidence in the results. Further, even small excerpts of the signal can be analyzed in this manner, permitting piracy of even small details of an original work to be detected. The results are thus statistically robust, both in the face of natural and human corruption of the suspect signal.

Illustrative Variations

From the foregoing description, it will be recognized that numerous modifications can be made to the illustrated systems without changing the fundamental principles. A few of these variations are described below.

The above-described decoding process tries both adding and subtracting stored noise data to/from the suspect signal in order to find which operation reduces entropy. In other embodiments, only one of these operations needs to be conducted. For example, in one alternative decoding process the stored noise data corresponding to every eighth sample of the suspect signal is only added to said samples. If the entropy of the resulting signal is thereby increased, then the corresponding bit of the code word is a "1" (i.e. this noise was added earlier, during the encoding process, so adding it again only compounds the signal's randomness). If the entropy of the resulting signal is thereby decreased, then the corresponding bit of the code word is a "0". A further test of entropy if the stored noise samples are subtracted is not required.

The statistical reliability of the identification process (coding and decoding) can be designed to exceed virtually any confidence threshold (e.g. 99.9%, 99.99%, 99.999%, etc. confidence) by appropriate selection of the global scaling factors, etc. Additional confidence in any given application (unnecessary in most applications) can be achieved by rechecking the decoding process.

One way to recheck the decoding process is to remove the stored noise data from the suspect signal in accordance with the bits of the discerned code word, yielding a "restored" signal (e.g. if the first bit of the code word is found to be "1," then the noise samples stored in the 1st, 9th, 17th, etc. locations of the memory 214 are subtracted from the corresponding samples of the suspect signal). The entropy of the restored signal is measured and used as a baseline in further measurements. Next, the process is repeated, this time removing the stored noise data from the suspect signal in accordance with a modified code word. The modified code word is the same as the discerned code word, except 1 bit is toggled (e.g. the first). The entropy of the resulting signal is determined, and compared with the baseline. If the toggling of the bit in the discerned code word resulted in increased entropy, then the accuracy of that bit of the discerned code word is confirmed. The process repeats, each time with a different bit of the discerned code word toggled, until all bits of the code word have been so checked. Each change should result in an increase in entropy compared to the baseline value.

The data stored in memory 214 is subject to a variety of alternatives. In the foregoing discussion, memory 214 contains the scaled noise data. In other embodiments, the unscaled noise data can be stored instead.

In still other embodiments, it can be desirable to store at least part of the input signal itself in memory 214. For example, the memory can allocate 8 signed bits to the noise sample, and 16 bits to store the most significant bits of an 18- or 20-bit audio signal sample. This has several benefits. One is that it simplifies registration of a "suspect" signal. Another is that, in the case of encoding an input signal which was already encoded, the data in memory 214 can be used to discern which of the encoding processes was performed first. That is, from the input signal data in memory 214 (albeit incomplete), it is generally possible to determine with which of two code words it has been encoded.

Yet another alternative for memory 214 is that is can be omitted altogether.

One way this can be achieved is to use a deterministic noise source in the encoding process, such as an algorithmic noise generator seeded with a known key number. The same deterministic noise source, seeded with the same key number, can be used in the decoding process. In such an arrangement, only the key number needs be stored for later use in decoding, instead of the large data set usually stored in memory 214.

Alternatively, if the noise signal added during encoding does not have a zero mean value, and the length N of the code word is known to the decoder, then a universal decoding process can be implemented. This process uses the same entropy test as the foregoing procedures, but cycles through possible code words, adding/subtracting a small dummy noise value (e.g. less than the expected mean noise value) to every Nth sample of the suspect signal, in accordance with the bits of the code word being tested, until a reduction in entropy is noted. Such an approach is not favored for most applications, however, because it offers less security than the other embodiments (e.g. it is subject to cracking by brute force).

Figure 7:
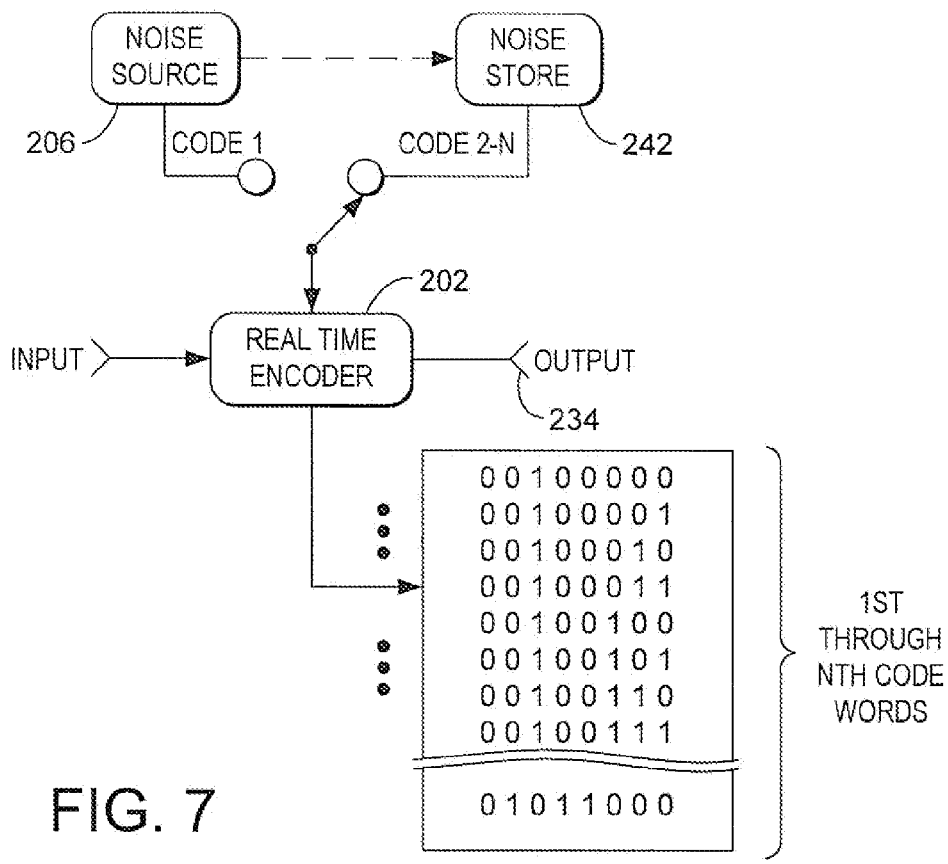
FIG. 7 shows a variant of the FIG. 6 embodiment adapted to encode successive sets of input data with different code words but with the same noise data.

Many applications are well served by the embodiment illustrated in FIG. 7, in which different code words are used to produce several differently encoded versions of an input signal, each making use of the same noise data. More particularly, the embodiment 240 of FIG. 7 includes a noise store 242 into which noise from source 206 is written during the identification-coding of the input signal with a first code word. (The noise source of FIG. 7 is shown outside of the real time encoder 202 for convenience of illustration.) Thereafter, additional identification-coded versions of the input signal can be produced by reading the stored noise data from the store and using it in conjunction with second through Nth code words to encode the signal. (While binary-sequential code words are illustrated in FIG. 7, in other embodiments arbitrary sequences of code words can be employed.) With such an arrangement, a great number of differently-encoded signals can be produced, without requiring a proportionally-sized long term noise memory. Instead, a fixed amount of noise data is stored, whether encoding an original once or a thousand times.

(If desired, several differently-coded output signals can be produced at the same time, rather than seriatim. One such implementation includes a plurality of adder/subtracter circuits 212, each driven with the same input signal and with the same scaled noise signal, but with different code words. Each, then, produces a differently encoded output signal.)

In applications having a great number of differently-encoded versions of the same original, it will be recognized that the decoding process need not always discern every bit of the code word. Sometimes, for example, the application may require identifying only a group of codes to which the suspect signal belongs. (E.g., high order bits of the code word might indicate an organization to which several differently coded versions of the same source material were provided, with low-order bits identifying specific copies. To identify the organization with which a suspect signal is associated, it may not be necessary to examine the low order bits, since the organization can be identified by the high order bits alone.) If the identification requirements can be met by discerning a subset of the code word bits in the suspect signal, the decoding process can be shortened.

Figure 8:
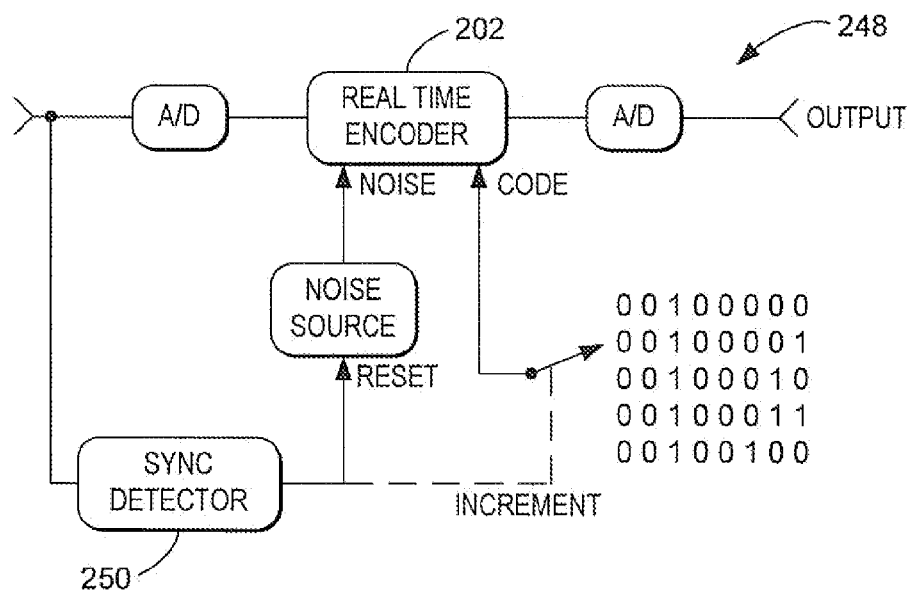
FIG. 8 shows a variant of the FIG. 6 embodiment adapted to encode each frame of a videotaped production with a unique code number.

Some applications may be best served by restarting the encoding process—sometimes with a different code word—several times within an integral work. Consider, as an example, videotaped productions (e.g. television programming). Each frame of a videotaped production can be identification-coded with a unique code number, processed in real-time with an arrangement 248 like that shown in FIG. 8. Each time a vertical retrace is detected by sync detector 250, the noise source 206 resets (e.g. to repeat the sequence just produced) and an identification code increments to the next value. Each frame of the videotape is thereby uniquely identification-coded. Typically, the encoded signal is stored on a videotape for long term storage (although other storage media, including laser disks, can be used).

Returning to the encoding apparatus, the look-up table 204 in the illustrated embodiment exploits the fact that high amplitude samples of the input data signal can tolerate (without objectionable degradation of the output signal) a higher level of encoded identification coding than can low amplitude input samples. Thus, for example, input data samples having decimal values of 0, 1 or 2 may be correspond (in the look-up table 204) to scale factors of unity (or even zero), whereas input data samples having values in excess of 200 may correspond to scale factors of 15. Generally speaking, the scale factors and the input sample values correspond by a square root relation. That is, a four-fold increase in a value of the sampled input signal corresponds to approximately a two-fold increase in a value of the scaling factor associated therewith.

(The parenthetical reference to zero as a scaling factor alludes to cases, e.g., in which the source signal is temporally or spatially devoid of information content. In an image, for example, a region characterized by several contiguous sample values of zero may correspond to a jet black region of the frame. A scaling value of zero may be appropriate here since there is essentially no image data to be pirated.)

Continuing with the encoding process, those skilled in the art will recognized the potential for "rail errors" in the illustrated embodiment. For example, if the input signal consists of 8-bit samples, and the samples span the entire range from 0 to 255 (decimal), then the addition or subtraction of scaled noise to/from the input signal may produce output signals that cannot be represented by 8 bits (e.g. −2, or 257). A number of well-understood techniques exist to rectify this situation, some of them proactive and some of them reactive. (Among these known techniques are: specifying that the input signal shall not have samples in the range of 0-4 or 251-255, thereby safely permitting modulation by the noise signal; or including provision for detecting and adaptively modifying input signal samples that would otherwise cause rail errors.)

While the illustrated embodiment describes stepping through the code word sequentially, one bit at a time, to control modulation of successive bits of the input signal, it will be appreciated that the bits of the code word can be used other than sequentially for this purpose. Indeed, bits of the code word can be selected in accordance with any predetermined algorithm.

The dynamic scaling of the noise signal based on the instantaneous value of the input signal is an optimization that can be omitted in many embodiments. That is, the look-up table 204 and the first scaler 208 can be omitted entirely, and the signal from the digital noise source 206 applied directly (or through the second, global scaler 210) to the adder/subtracter 212.

It will be further recognized that the use of a zero-mean noise source simplifies the illustrated embodiment, but is not necessary. A noise signal with another mean value can readily be used, and D.C. compensation (if needed) can be effected elsewhere in the system.

The use of a noise source 206 is also optional. A variety of other signal sources can be used, depending on application-dependent constraints (e.g. the threshold at which the encoded identification signal becomes perceptible). In many instances, the level of the embedded identification signal is low enough that the identification signal needn't have a random aspect; it is imperceptible regardless of its nature. A pseudo random source 206, however, is usually desired because it provides the greatest identification code signal S/N ratio (a somewhat awkward term in this instance) for a level of imperceptibility of the embedded identification signal.

It will be recognized that identification coding need not occur after a signal has been reduced to stored form as data (i.e. "fixed in tangible form," in the words of the U.S. Copyright Act). Consider, for example, the case of popular musicians whose performance are often recorded illicitly. By identification coding the audio before it drives concert hall speakers, unauthorized recordings of the concert can be traced to a particular place and time. Likewise, live audio sources such as 911 emergency calls can be encoded prior to recording so as to facilitate their later authentication.

While the black box embodiment has been described as a stand alone unit, it will be recognized that it can be integrated into a number of different tools/instruments as a component. One is a scanner, which can embed identification codes in the scanned output data. (The codes can simply serve to memorialize that the data was generated by a particular scanner).

Another is in creativity software, such as popular drawing/graphics/animation/paint programs offered by Adobe, Macromedia, Corel, and the like.

Finally, while the real-time encoder 202 has been illustrated with reference to a particular hardware implementation, it will be recognized that a variety of other implementations can alternatively be employed. Some utilize other hardware configurations. Others make use of software routines for some or all of the illustrated functional blocks. (The software routines can be executed on any number of different general purpose programmable computers, such as 80×86 PC-compatible computers, RISC-based workstations, etc.)

Types of Noise, Quasi-Noise, and Optimized-Noise

Heretofore this disclosure postulated Gaussian noise, "white noise," and noise generated directly from application instrumentation as a few of the many examples of the kind of carrier signal appropriate to carry a single bit of information throughout an image or signal. It is possible to be even more proactive in "designing" characteristics of noise in order to achieve certain goals. The "design" of using Gaussian or instrumental noise was aimed somewhat toward "absolute" security. This section of the disclosure takes a look at other considerations for the design of the noise signals which may be considered the ultimate carriers of the identification information.

For some applications it might be advantageous to design the noise carrier signal (e.g. the Nth embedded code signal in the first embodiment; the scaled noise data in the second embodiment), so as to provide more absolute signal strength to the identification signal relative to the perceptibility of that signal. One example is the following. It is recognized that a true Gaussian noise signal has the value '0' occur most frequently, followed by 1 and −1 at equal probabilities to each other but lower than '0', 2 and −2 next, and so on. Clearly, the value zero carries no information as it is used in the service of this particular embodiment. Thus, one simple adjustment, or design, would be that any time a zero occurs in the generation of the embedded code signal, a new process takes over, whereby the value is converted "randomly" to either a 1 or a −1. In logical terms, a decision would be made: if '0', then random (1,−1). The histogram of such a process would appear as a Gaussian/Poissonian type distribution, except that the 0 bin would be empty and the 1 and −1 bin would be increased by half the usual histogram value of the 0 bin.

In this case, identification signal energy would always be applied at all parts of the signal. A few of the trade-offs include: there is a (probably negligible) lowering of security of the codes in that a "deterministic component" is a part of generating the noise signal. The reason this might be completely negligible is that we still wind up with a coin flip type situation on randomly choosing the 1 or the −1. Another trade-off is that this type of designed noise will have a higher threshold of perceptibility, and will only be applicable to applications where the least significant bit of a data stream or image is already negligible relative to the commercial value of the material, i.e. if the least significant bit were stripped from the signal (for all signal samples), no one would know the difference and the value of the material would not suffer. This blocking of the zero value in the example above is but one of many ways to "optimize" the noise properties of the signal carrier, as anyone in the art can realize. We refer to this also as "quasi-noise" in the sense that natural noise can be transformed in a pre-determined way into signals which for all intents and purposes will read as noise. Also, cryptographic methods and algorithms can easily, and often by definition, create signals which are perceived as completely random. Thus the word "noise" can have different connotations, primarily between that as defined subjectively by an observer or listener, and that defined mathematically. The difference of the latter is that mathematical noise has different properties of security and the simplicity with which it can either be "sleuthed" or the simplicity with which instruments can "automatically recognize" the existence of this noise.

"Universal" Embedded Codes

The bulk of this disclosure teaches that for absolute security, the noise-like embedded code signals which carry the bits of information of the identification signal should be unique to each and every encoded signal, or, slightly less restrictive, that embedded code signals should be generated sparingly, such as using the same embedded codes for a batch of 1000 pieces of film, for example. Be this as it may, there is a whole other approach to this issue wherein the use of what we will call "universal" embedded code signals can open up large new applications for this technology. The economics of these uses would be such that the de facto lowered security of these universal codes (e.g. they would be analyzable by time honored cryptographic decoding methods, and thus potentially thwarted or reversed) would be economically negligible relative to the economic gains that the intended uses would provide. Piracy and illegitimate uses would become merely a predictable "cost" and a source of uncollected revenue only; a simple line item in an economic analysis of the whole. A good analogy of this is in the cable industry and the scrambling of video signals. Everybody seems to know that crafty, skilled technical individuals, who may be generally law abiding citizens, can climb a ladder and flip a few wires in their cable junction box in order to get all the pay channels for free. The cable industry knows this and takes active measures to stop it and prosecute those caught, but the "lost revenue" derived from this practice remains prevalent but almost negligible as a percentage of profits gained from the scrambling system as a whole. The scrambling system as a whole is an economic success despite its lack of "absolute security."

The same holds true for applications of this technology wherein, for the price of lowering security by some amount, large economic opportunity presents itself. This section first describes what is meant by universal codes, then moves on to some of the interesting uses to which these codes can be applied.

Universal embedded codes generally refer to the idea that knowledge of the exact codes can be distributed. The embedded codes won't be put into a dark safe never to be touched until litigation arises (as alluded to in other parts of this disclosure), but instead will be distributed to various locations where on-the-spot analysis can take place. Generally this distribution will still take place within a security controlled environment, meaning that steps will be taken to limit the knowledge of the codes to those with a need to know. Instrumentation which attempts to automatically detect copyrighted material is a non-human example of "something" with a need to know the codes.

There are many ways to implement the idea of universal codes, each with their own merits regarding any given application. For the purposes of teaching this art, we separate these approaches into three broad categories: universal codes based on libraries, universal codes based on deterministic formula, and universal codes based on pre-defined industry standard patterns. A rough rule of thumb is that the first is more secure than the latter two, but that the latter two are possibly more economical to implement than the first.

Universal Codes: 1) Libraries of Universal Codes

The use of libraries of universal codes simply means that the techniques of this technology are employed as described, except for the fact that only a limited set of the individual embedded code signals are generated and that any given encoded material will make use of some sub-set of this limited "universal set." An example is in order here. A photographic print paper manufacturer may wish to pre-expose every piece of 8 by 10 inch print paper which they sell with a unique identification code. They also wish to sell identification code recognition software to their large customers, service bureaus, stock agencies, and individual photographers, so that all these people can not only verify that their own material is correctly marked, but so that they can also determine if third party material which they are about to acquire has been identified by this technology as being copyrighted. This latter information will help them verify copyright holders and avoid litigation, among many other benefits. In order to "economically" institute this plan, they realize that generating unique individual embedded codes for each and every piece of print paper would generate Terabytes of independent information, which would need storing and to which recognition software would need access. Instead, they decide to embed their print paper with 16 bit identification codes derived from a set of only 50 independent "universal" embedded code signals. The details of how this is done are in the next paragraph, but the point is that now their recognition software only needs to contain a limited set of embedded codes in their library of codes, typically on the order of 1 Megabyte to 10 Megabytes of information for 50×16 individual embedded codes splayed out onto an 8×10 photographic print (allowing for digital compression). The reason for picking 50 instead of just 16 is one of a little more added security, where if it were the same 16 embedded codes for all photographic sheets, not only would the serial number capability be limited to 2 to the 16th power, but lesser and lesser sophisticated pirates could crack the codes and remove them using software tools.

There are many different ways to implement this scheme, where the following is but one exemplary method. It is determined by the wisdom of company management that a 300 pixels per inch criteria for the embedded code signals is sufficient resolution for most applications. This means that a composite embedded code image will contain 3000 pixels by 2400 pixels to be exposed at a very low level onto each 8×10 sheet. This gives 7.2 million pixels. Using our staggered coding system such as described in the black box implementation of FIGS. 5 and 6, each individual embedded code signal will contain only 7.2 million divided by 16, or approximately 450K true information carrying pixels, i.e. every 16th pixel along a given raster line. These values will typically be in the range of 2 to −2 in digital numbers, or adequately described by a signed 3 bit number. The raw information content of an embedded code is then approximately ⅜th's bytes times 450K or about 170 Kilobytes. Digital compression can reduce this further. All of these decisions are subject to standard engineering optimization principles as defined by any given application at hand, as is well known in the art. Thus we find that 50 of these independent embedded codes will amount to a few Megabytes. This is quite reasonable level to distribute as a "library" of universal codes within the recognition software. Advanced standard encryption devices could be employed to mask the exact nature of these codes if one were concerned that would-be pirates would buy the recognition software merely to reverse engineer the universal embedded codes. The recognition software could simply unencrypt the codes prior to applying the recognition techniques taught in this disclosure.

The recognition software itself would certainly have a variety of features, but the core task it would perform is determining if there is some universal copyright code within a given image. The key questions become WHICH 16 of the total 50 universal codes it might contain, if any, and if there are 16 found, what are their bit values. The key variables in determining the answers to these questions are: registration, rotation, magnification (scale), and extent. In the most general case with no helpful hints whatsoever, all variables must be independently varied across all mutual combinations, and each of the 50 universal codes must then be checked by adding and subtracting to see if an entropy decrease occurs. Strictly speaking, this is an enormous job, but many helpful hints will be found which make the job much simpler, such as having an original image to compare to the suspected copy, or knowing the general orientation and extent of the image relative to an 8×10 print paper, which then through simple registration techniques can determine all of the variables to some acceptable degree. Then it merely requires cycling through the 50 universal codes to find any decrease in entropy. If one does, then 15 others should as well. A protocol needs to be set up whereby a given order of the 50 translates into a sequence of most significant bit through least significant bit of the ID code word. Thus if we find that universal code number "4" is present, and we find its bit value to be "0", and that universal codes "1" through "3" are definitely not present, then our most significant bit of our N-bit ID code number is a "0". Likewise, we find that the next lowest universal code present is number "7" and it turns out to be a "1", then our next most significant bit is a "1". Done properly, this system can cleanly trace back to the copyright owner so long as they registered their photographic paper stock serial number with some registry or with the manufacturer of the paper itself. That is, we look up in the registry that a paper using universal embedded codes 4, 7, 11, 12, 15, 19, 21, 26, 27, 28, 34, 35, 37, 38, 40, and 48, and having the embedded code 0110 0101 0111 0100 belongs to Leonardo de Boticelli, an unknown wildlife photographer and glacier cinematographer whose address is in Northern Canada. We know this because he dutifully registered his film and paper stock, a few minutes of work when he bought the stock, which he plopped into the "no postage necessary" envelope that the manufacturing company kindly provided to make the process ridiculously simple. Somebody owes Leonardo a royalty check it would appear, and certainly the registry has automated this royalty payment process as part of its services.

One final point is that truly sophisticated pirates and others with illicit intentions can indeed employ a variety of cryptographic and not so cryptographic methods to crack these universal codes, sell them, and make software and hardware tools which can assist in the removing or distorting of codes. We shall not teach these methods as part of this disclosure, however. In any event, this is one of the prices which must be paid for the ease of universal codes and the applications they open up.

Universal Codes: 2) Universal Codes Based on Deterministic Formulas

The libraries of universal codes require the storage and transmittal of Megabytes of independent, generally random data as the keys with which to unlock the existence and identity of signals and imagery that have been marked with universal codes. Alternatively, various deterministic formulas can be used which "generate" what appear to be random data/image frames, thereby obviating the need to store all of these codes in memory and interrogate each and of the "50" universal codes. Deterministic formulas can also assist in speeding up the process of determining the ID code once one is known to exist in a given signal or image. On the other hand, deterministic formulas lend themselves to sleuthing by less sophisticated pirates. And once sleuthed, they lend themselves to easier communication, such as posting on the Internet to a hundred newsgroups. There may well be many applications which do not care about sleuthing and publishing, and deterministic formulas for generating the individual universal embedded codes might be just the ticket.

Universal Codes: 3) "Simple" Universal Codes

This category is a bit of a hybrid of the first two, and is most directed at truly large scale implementations of the principles of this technology. The applications employing this class are of the type where staunch security is much less important than low cost, large scale implementation and the vastly larger economic benefits that this enables. One exemplary application is placement of identification recognition units directly within modestly priced home audio and video instrumentation (such as a TV). Such recognition units would typically monitor audio and/or video looking for these copyright identification codes, and thence triggering simple decisions based on the findings, such as disabling or enabling recording capabilities, or incrementing program specific billing meters which are transmitted back to a central audio/video service provider and placed onto monthly invoices. Likewise, it can be foreseen that "black boxes" in bars and other public places can monitor (listen with a microphone) for copyrighted materials and generate detailed reports, for use by ASCAP, BMI, and the like.

A core principle of simple universal codes is that some basic industry standard "noiselike" and seamlessly repetitive patterns are injected into signals, images, and image sequences so that inexpensive recognition units can either A) determine the mere existence of a copyright "flag", and B) additionally to A, determine precise identification information which can facilitate more complex decision making and actions.

In order to implement this particular embodiment, the basic principles of generating the individual embedded noise signals need to be simplified in order to accommodate inexpensive recognition signal processing circuitry, while maintaining the properties of effective randomness and holographic permeation. With large scale industry adoption of these simple codes, the codes themselves would border on public domain information (much as cable scrambling boxes are almost de facto public domain), leaving the door open for determined pirates to develop black market countermeasures, but this situation would be quite analogous to the scrambling of cable video and the objective economic analysis of such illegal activity.

One prior art known to the applicant in this general area of pro-active copyright detection is the Serial Copy Management System adopted by many firms in the audio industry. To the best of applicant's knowledge, this system employs a non-audio "flag" signal which is not part of the audio data stream, but which is nevertheless grafted onto the audio stream and can indicate whether the associated audio data should or should not be duplicated. One problem with this system is that it is restricted to media and instrumentation which can support this extra "flag" signal. Another deficiency is that the flagging system carries no identity information which would be useful in making more complex decisions. Yet another difficulty is that high quality audio sampling of an analog signal can come arbitrarily close to making a perfect digital copy of some digital master and there seems to be no provision for inhibiting this possibility.

Figure 9A:
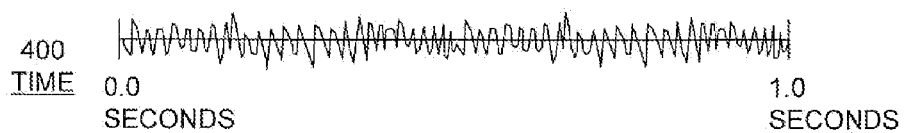
FIGS. 9A-9C are representations of an industry standard noise second that can be used in one embodiment.
Figure 9B:
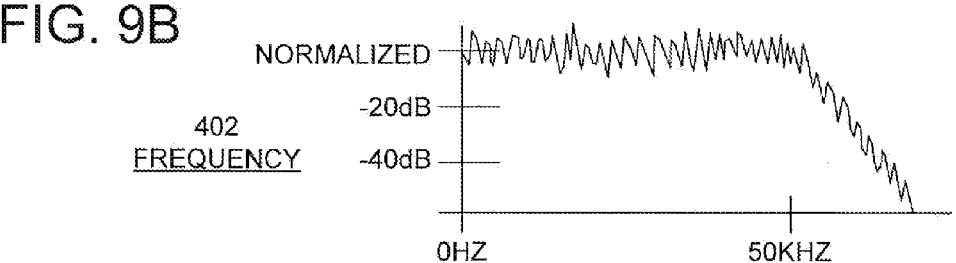
Figure 9C:
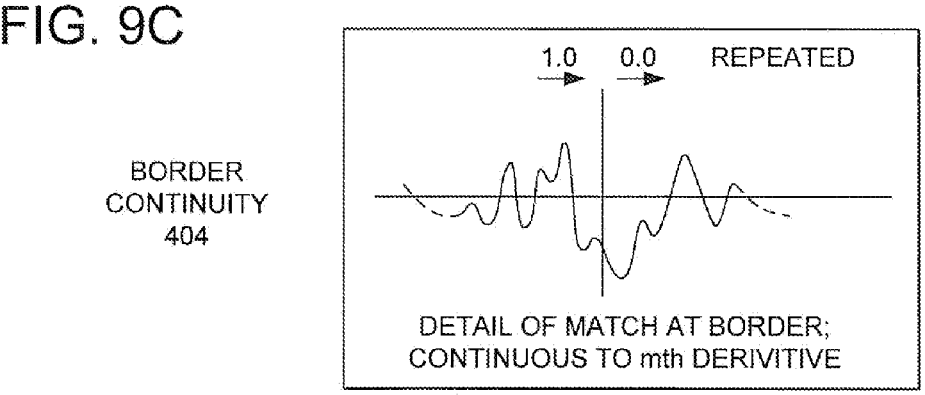

The principles of this technology can be brought to bear on these and other problems, in audio applications, video, and all of the other applications previously discussed. An exemplary application of simple universal codes is the following. A single industry standard "1.000000 second of noise" would be defined as the most basic indicator of the presence or absence of the copyright marking of any given audio signal. FIG. 9 has an example of what the waveform of an industry standard noise second might look like, both in the time domain 400 and the frequency domain 402. It is by definition a continuous function and would adapt to any combination of sampling rates and bit quanitizations. It has a normalized amplitude and can be scaled arbitrarily to any digital signal amplitude. The signal level and the first M'th derivatives of the signal are continuous at the two boundaries 404 (FIG. 9C), such that when it is repeated, the "break" in the signal would not be visible (as a waveform) or audible when played through a high end audio system. The choice of 1 second is arbitrary in this example, where the precise length of the interval will be derived from considerations such as audibility, quasi-white noise status, seamless repeatability, simplicity of recognition processing, and speed with which a copyright marking determination can be made. The injection of this repeated noise signal onto a signal or image (again, at levels below human perception) would indicate the presence of copyright material. This is essentially a one bit identification code, and the embedding of further identification information will be discussed later on in this section. The use of this identification technique can extend far beyond the low cost home implementations discussed here, where studios could use the technique, and monitoring stations could be set up which literally monitor hundreds of channels of information simultaneously, searching for marked data streams, and furthermore searching for the associated identity codes which could be tied in with billing networks and royalty tracking systems.

This basic, standardized noise signature is seamlessly repeated over and over again and added to audio signals which are to be marked with the base copyright identification. Part of the reason for the word "simple" is seen here: clearly pirates will know about this industry standard signal, but their illicit uses derived from this knowledge, such as erasure or corruption, will be economically minuscule relative to the economic value of the overall technique to the mass market. For most high end audio this signal will be some 80 to 100 dB down from full scale, or even much further; each situation can choose its own levels though certainly there will be recommendations. The amplitude of the signal can be modulated according to the audio signal levels to which the noise signature is being applied, i.e. the amplitude can increase significantly when a drum beats, but not so dramatically as to become audible or objectionable. These measures merely assist the recognition circuitry to be described.

Recognition of the presence of this noise signature by low cost instrumentation can be effected in a variety of ways. One rests on basic modifications to the simple principles of audio signal power metering. Software recognition programs can also be written, and more sophisticated mathematical detection algorithms can be applied to audio in order to make higher confidence detection identifications. In such embodiments, detection of the copyright noise signature involves comparing the time averaged power level of an audio signal with the time averaged power level of that same audio signal which has had the noise signature subtracted from it. If the audio signal with the noise signature subtracted has a lower power level that the unchanged audio signal, then the copyright signature is present and some status flag to that effect needs to be set. The main engineering subtleties involved in making this comparison include: dealing with audio speed playback discrepancies (e.g. an instrument might be 0.5% "slow" relative to exactly one second intervals); and, dealing with the unknown phase of the one second noise signature within any given audio (basically, its "phase" can be any-where from 0 to 1 seconds). Another subtlety, not so central as the above two but which nonetheless should be addressed, is that the recognition circuits should not subtract a higher amplitude of the noise signature than was originally embedded onto the audio signal. Fortunately this can be accomplished by merely subtracting only a small amplitude of the noise signal, and if the power level goes down, this is an indication of "heading toward a trough" in the power levels. Yet another related subtlety is that the power level changes will be very small relative to the overall power levels, and calculations generally will need to be done with appropriate bit precision, e.g. 32 bit value operations and accumulations on 16-20 bit audio in the calculations of time averaged power levels.

Figure 10:
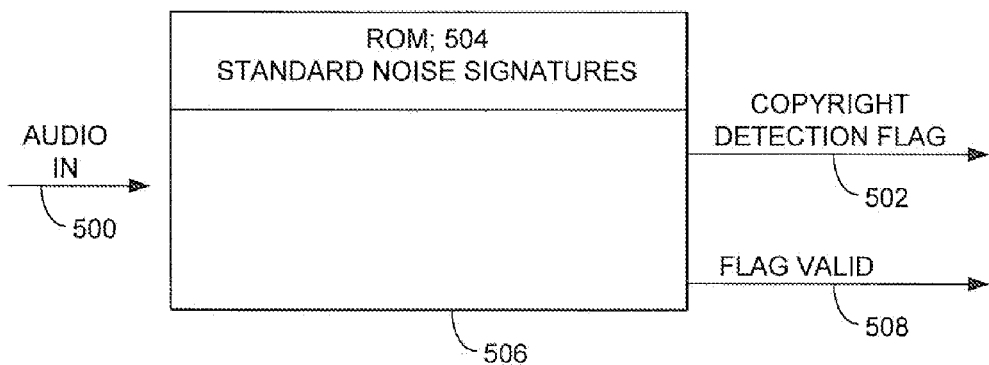
FIG. 10 shows an integrated circuit used in detecting standard noise codes.

Clearly, designing and packaging this power level comparison processing circuitry for low cost applications is an engineering optimization task. One trade-off will be the accuracy of making an identification relative to the "short-cuts" which can be made to the circuitry in order to lower its cost and complexity. A preferred embodiment for the placement of this recognition circuitry inside of instrumentation is through a single programmable integrated circuit which is custom made for the task. FIG. 10 shows one such integrated circuit 506. Here the audio signal comes in, 500, either as a digital signal or as an analog signal to be digitized inside the IC 500, and the output is a flag 502 which is set to one level if the copyright noise signature is found, and to another level if it is not found. Also depicted is the fact that the standardized noise signature waveform is stored in Read Only Memory, 504, inside the IC 506. There will be a slight time delay between the application of an audio signal to the IC 506 and the output of a valid flag 502, due to the need to monitor some finite portion of the audio before a recognition can place. In this case, there may need to be a "flag valid" output 508 where the IC informs the external world if it has had enough time to make a proper determination of the presence or absence of the copyright noise signature.

Figure 11:
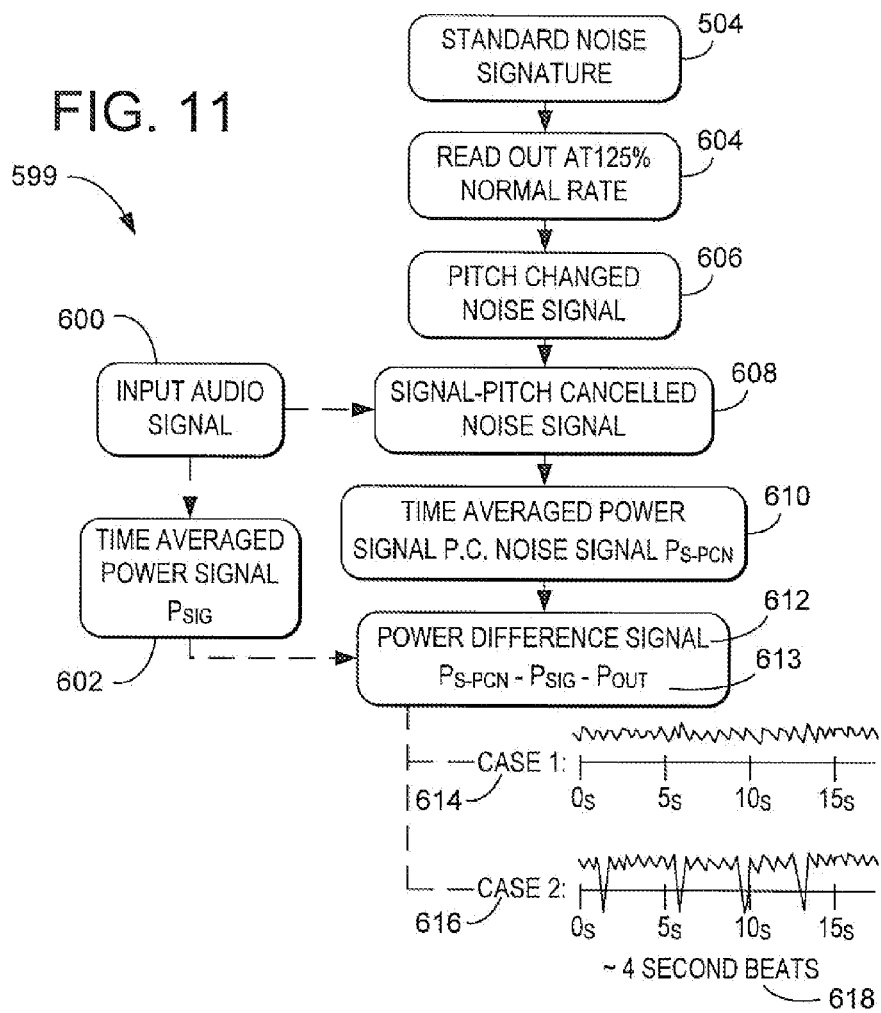
FIG. 11 shows a process flow for detecting a standard noise code that can be used in the FIG. 10 embodiment.
Figure 12:
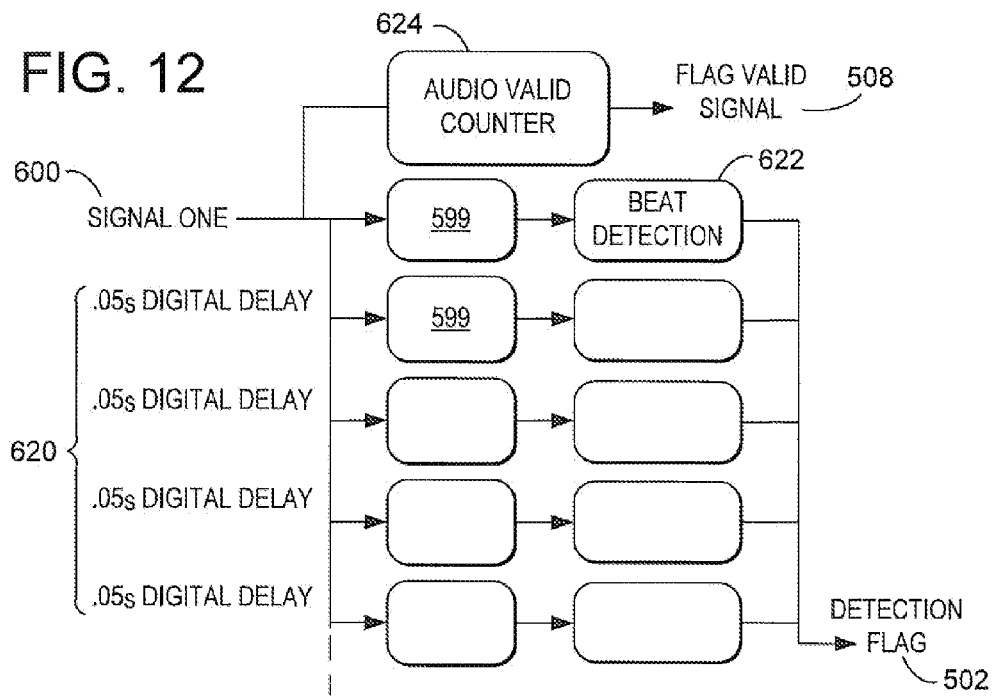
FIG. 12 is an embodiment employing a plurality of detectors in accordance with another embodiment.

There are a wide variety of specific designs and philosophies of designs applied to accomplishing the basic function of the IC 506 of FIG. 10. Audio engineers and digital signal processing engineers are able to generate several fundamentally different designs. One such design is depicted in FIG. 11 by a process 599, which itself is subject to further engineering optimization as will be discussed. FIG. 11 depicts a flow chart for any of: an analog signal processing network, a digital signal processing network, or programming steps in a software program. We find an input signal 600 which along one path is applied to a time averaged power meter 602, and the resulting power output itself treated as a signal $P_{sig}$. To the upper right we find the standard noise signature 504 which will be read out at 125% of normal speed, 604, thus changing its pitch, giving the "pitch changed noise signal" 606. Then the input signal has this pitch changed noise signal subtracted in step 608, and this new signal is applied to the same form of time averaged power meter as in 602, here labeled 610. The output of this operation is also a time based signal here labeled as $P_{s\text{-}pcn}$, 610. Step 612 then subtracts the power signal 602 from the power signal 610, giving an output difference signal $P_{out}$, 613. If the universal standard noise signature does indeed exist on the input audio signal 600, then case 2, 616, will be created wherein a beat signal 618 of approximately 4 second period will show up on the output signal 613, and it remains to detect this beat signal with a step such as in FIG. 12, 622. Case 1, 614, is a steady noisy signal which exhibits no periodic beating. 125% at step 604 is chosen arbitrarily here, where engineering considerations would determine an optimal value, leading to different beat signal frequencies 618. Whereas waiting 4 seconds in this example would be quite a while, especially is you would want to detect at least two or three beats, FIG. 12 outlines how the basic design of FIG. 11 could be repeated and operated upon various delayed versions of the input signal, delayed by something like ½0th of a second, with 20 parallel circuits working in concert each on a segment of the audio delayed by 0.05 seconds from their neighbors. In this way, a beat signal will show up approximately every ⅕th of a second and will look like a traveling wave down the columns of beat detection circuits. The existence or absence of this traveling beat wave triggers the detection flag 502. Meanwhile, there would be an audio signal monitor 624 which would ensure that, for example, at least two seconds of audio has been heard before setting the flag valid signal 508.

Though the audio example was described above, it should be clear to anyone in the art that the same type of definition of some repetitive universal noise signal or image could be applied to the many other signals, images, pictures, and physical media already discussed.

The above case deals only with a single bit plane of information, i.e., the noise signature signal is either there (1) or it isn't (0). For many applications, it would be nice to detect serial number information as well, which could then be used for more complex decisions, or for logging information on billing statements or whatnot. The same principles as the above would apply, but now there would be N independent noise signatures as depicted in FIG. 9 instead one single such signature. Typically, one such signature would be the master upon which the mere existence of a copyright marking is detected, and this would have generally higher power than the others, and then the other lower power "identification" noise signatures would be embedded into audio. Recognition circuits, once having found the existence of the primary noise signature, would then step through the other N noise signatures applying the same steps as described above. Where a beat signal is detected, this indicates the bit value of '1', and where no beat signal is detected, this indicates a bit value of '0'. It might be typical that N will equal 32, that way $2^{32}$ number of identification codes are available to any given industry employing this technology.

Use of this Technology when the Length of the Identification Code is 1

The principles detailed herein can obviously be applied in the case where only a single presence or absence of an identification signal—a fingerprint if you will—is used to provide confidence that some signal or image is copyrighted. The example above of the industry standard noise signature is one case in point. We no longer have the added confidence of the coin flip analogy, we no longer have tracking code capabilities or basic serial number capabilities, but many applications may not require these attributes and the added simplicity of a single fingerprint might outweigh these other attributes in any event.

The "Wallpaper" Analogy

The term "holographic" has been used in this disclosure to describe how an identification code number is distributed in a largely integral form throughout an encoded signal or image. This also refers to the idea that any given fragment of the signal or image contains the entire unique identification code number. As with physical implementations of holography, there are limitations on how small a fragment can become before one begins to lose this property, where the resolution limits of the holographic media are the main factor in this regard for holography itself. In the case of an uncorrupted distribution signal which has used the encoding device of FIG. 5, and which furthermore has used our "designed noise" of above wherein the zero's were randomly changed to a 1 or −1, then the extent of the fragment required is merely N contiguous samples in a signal or image raster line, where N is as defined previously being the length of our identification code number. This is an informational extreme; practical situations where noise and corruption are operative will require generally one, two or higher orders of magnitude more samples than this simple number N. Those skilled in the art will recognize that there are many variables involved in pinning down precise statistics on the size of the smallest fragment with which an identification can be made.

For tutorial purposes, the applicant also uses the analogy that the unique identification code number is "wallpapered" across and image (or signal). That is, it is repeated over and over again all throughout an image. This repetition of the ID code number can be regular, as in the use of the encoder of FIG. 5, or random itself, where the bits in the ID code 216 of FIG. 6 are not stepped through in a normal repetitive fashion but rather are randomly selected on each sample, and the random selection stored along with the value of the output 228 itself. in any event, the information carrier of the ID code, the individual embedded code signal, does change across the image or signal. Thus as the wallpaper analogy summarizes: the ID code repeats itself over and over, but the patterns that each repetition imprints change randomly accordingly to a generally unsleuthable key.

Towards Steganography Proper and the Use of this Technology in Passing More Complex Messages or Information This disclosure concentrates on what above was called wallpapering a single identification code across an entire signal. This appears to be a desirable feature for many applications. However, there are other applications where it might be desirable to pass messages or to embed very long strings of pertinent identification information in signals and images. One of many such possible applications would be where a given signal or image is meant to be manipulated by several different groups, and that certain regions of an image are reserved for each group's identification and insertion of pertinent manipulation information.

In these cases, the code word 216 in FIG. 6 can actually change in some pre-defined manner as a function of signal or image position. For example, in an image, the code could change for each and every raster line of the digital image. It might be a 16 bit code word, 216, but each scan line would have a new code word, and thus a 480 scan line image could pass a 980 (480×2 bytes) byte message. A receiver of the message would need to have access to either the noise signal stored in memory 214, or would have to know the universal code structure of the noise codes if that method of coding was being used. To the best of applicant's knowledge, this is a novel approach to the mature field of steganography.

In all three of the foregoing applications of universal codes, it will often be desirable to append a short (perhaps 8- or 16-bit) private code, which users would keep in their own secured places, in addition to the universal code. This affords the user a further modicum of security against potential erasure of the universal codes by sophisticated pirates.

CONCLUSION

In view of the great number of different embodiments to which the principles of the present-detailed technology can be put, it should be recognized that the detailed embodiments are illustrative only and should not be taken as limiting the scope of my work. Rather, I claim all such embodiments as may come within the scope and spirit of the following claims, and equivalents thereto.

I claim:

1. A method comprising:

utilizing a programmed electronic processor, steganographically encoding content with a first message, the steganographic encoding being performed by a first party, the steganographic encoding including altering digital data representing human-perceptible attributes of the content; and utilizing a programmed electronic processor, further steganographically encoding the content with a second message, the further steganographic encoding being performed by a second party different than the first party, the further steganographic encoding including altering digital data representing human-perceptible attributes of the content;

wherein at least one of the steganographic encodings includes altering the digital data in a manner dependent on the content; and wherein the content further comprises visual content, and at least one of the steganographic encodings repeatedly represents a corresponding message in the content, the corresponding message being represented differently at different locations in the encoded content.

2. The method of claim 1, further comprising steganographically encoding the content with a third message, the still further steganographic encoding being performed by a third party different than the first and second parties, wherein all three of the messages are represented in the encoded content.

3. The method of claim 1, wherein the first party steganographically encodes a first portion of the content, and the second party steganographically encodes a second portion of the content different than the first.

4. The method of claim 3, wherein the portions comprise regions of pixels.

5. The method of claim 1, wherein at least one of the first or second messages comprises data that serves to identify the content.

6. A non-transitory computer readable medium having instructions that, if executed by a computing device, cause the computing device to perform operations comprising:

steganographically encoding content with a first message, the steganographic encoding being performed by a first party, the steganographic encoding including altering digital data representing human-perceptible attributes of the content; and further steganographically encoding the content with a second message, the further steganographic encoding being performed by a second party different than the first party, the further steganographic encoding including altering digital data representing human-perceptible attributes of the content;

wherein at least one of the steganographic encodings includes altering the digital data in a manner dependent on the content.

7. A programmed computing device comprising instructions stored in memory, the instructions comprising:

instructions to steganographically encode content with a first message, the steganographic encoding being performed by a first party, the steganographic encoding including altering digital data representing human-perceptible attributes of the content; and instructions to further steganographically encode the content with a second message, the further steganographic encoding being performed by a second party different than the first party, the further steganographic encoding including altering digital data representing human-perceptible attributes of the content;

wherein at least one of the steganographic encodings includes altering the digital data in a manner dependent on the content.

8. An apparatus comprising:

electronic memory for buffering obtained content; and an electronic processor programmed for:

obtaining steganographically encoded content, the steganographically encoded content having a first message steganographically encoded therein, the steganographic encoding being performed by a first party remotely located from the electronic processor, the first message having been steganographically encoded in the content by altering digital data representing human-perceptible attributes of the content; and further steganographically encoding the content with a second message, the further steganographic encoding being performed by a second party different than the first party, the further steganographic encoding including altering digital data representing human-perceptible attributes of the content;

wherein at least one of the steganographic encodings includes altering the digital data in a manner dependent on the content; and wherein the content comprises visual content, and at least one of the encodings repeatedly represents the corresponding message in the content, the message being represented differently at different locations in the encoded content.

9. The apparatus of claim 8, wherein the first party steganographically encodes a first portion of the content, and the second party steganographically encodes a second portion of the content different than the first.

10. A method comprising:

receiving content that has been previously steganographically encoded with first plural-bit data;

utilizing a programmed electronic processor, further steganographically encoding the content with a second plural-bit data different than the first, the further encoding including altering digital data representing human-perceptible attributes of the content, in a manner that is dependent on the content; and processing the received content to determine a parameter, and using the parameter in the further encoding;

wherein both the first and second plural-bit data are represented in encoded content.

11. The method of claim 10, wherein the content comprises visual content.

12. The method of claim 10, wherein the received content has first portions that are steganographically encoded, and second portions of the content are steganographically encoded.

13. The method of claim 12, wherein the portions comprise regions of pixels.

14. The method of claim 10, wherein the second plural-bit data serves to identify said content.

15. A non-transitory computer readable medium having instructions that, if executed by a computing device, cause the computing device to perform operations comprising:

receiving content that has been previously steganographically encoded by a second party with first plural-bit data; and further steganographically encoding the content with a second plural-bit data different than the first, the further encoding including altering digital data representing human-perceptible attributes of the content, in a mariner that is dependent on the content;

wherein both the first and second plural-bit data are represented in encoded content.

16. A programmed computing device comprising instructions stored in memory, the instructions comprising:

instructions to receive content that has been previously steganographically encoded with first plural-bit data;

instructions to further steganographically encode the content with a second plural-bit data different than the first, the further encoding including altering digital data representing human-perceptible attributes of the content, in a manner that is dependent on the content; and instructions to process the received content to determine a parameter, and use the parameter in the further encoding;

wherein both the first and second plural-bit data are represented in encoded content.

* * * * *

UNITED STATES PATENT AND TRADEMARK OFFICE
CERTIFICATE OF CORRECTION

PATENT NO. : 8,073,193 B2
APPLICATION NO. : 12/560177
DATED : December 6, 2011
INVENTOR(S) : Rhoads Page 1 of 1

It is certified that error appears in the above-identified patent and that said Letters Patent is hereby corrected as shown below:

Title Page 4, in Field (56), under "OTHER PUBLICATIONS", in Column 1, Line 12, delete "Specturm" and insert -- Spectrum --, therefor.

Title Page 4, in Field (56), under "OTHER PUBLICATIONS", in Column 2, Line 17, delete "van" and insert -- Van --, therefor.

Title Page 5, in Field (56), under "OTHER PUBLICATIONS", in Column 1, Line 2, delete "Rexam Non FInal" and insert -- Reexam Non Final --, therefor.

Title Page 5, in Field (56), under "OTHER PUBLICATIONS", in Column 1, Line 3, delete "2001-Rexam" and insert -- 2000 Determination-Reexam --, therefor.

In Fig. 2, Sheet 2 of 7, in Box 10, in Line 1, delete "CAMMA" and insert -- GAMMA --, therefor.

In Fig. 5, Sheet 4 of 7, delete "(e,g. 01101001" and insert -- (e.g., 01101001) --, therefor.

In Column 2, Line 52, delete "the of" and insert -- the --, therefor.

In Column 29, Line 6, delete "quanitizations." and insert -- quantizations. --, therefor.

In Column 32, Line 21, delete "in" and insert -- In --, therefor.

In Column 35, Line 1, in Claim 15, delete "mariner" and insert -- manner --, therefor.

Signed and Sealed this
Nineteenth Day of June, 2012

David J. Kappos
*Director of the United States Patent and Trademark Office*